United States Patent
Yang

(10) Patent No.: US 10,193,468 B1
(45) Date of Patent: Jan. 29, 2019

(54) LOW HARMONIC DOWN-CONVERTING RECTIFIER FOR WIRELESS POWER TRANSFER RECEIVER

(71) Applicant: Futurewei Technologies, Inc., Plano, TX (US)

(72) Inventor: Songnan Yang, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/851,492

(22) Filed: Dec. 21, 2017

(51) Int. Cl.
  *H02M 7/219* (2006.01)
  *H02M 1/44* (2007.01)
  *H02J 7/02* (2016.01)
  *H02M 1/12* (2006.01)
  *H02J 50/12* (2016.01)

(52) U.S. Cl.
  CPC ............. *H02M 7/219* (2013.01); *H02J 7/025* (2013.01); *H02J 50/12* (2016.02); *H02M 1/12* (2013.01); *H02M 1/44* (2013.01)

(58) Field of Classification Search
  CPC .......... H02M 7/219; H02M 1/12; H02M 1/44; H02J 50/12; H02J 7/025
  See application file for complete search history.

(56) References Cited

U.S. PATENT DOCUMENTS

| 9,450,506 | B2 | 9/2016 | Perreault et al. | |
| 9,541,941 | B2 * | 1/2017 | Ramorini | H02J 50/00 |
| 2016/0116925 | A1 * | 4/2016 | Freeman | H02M 3/33546 |
| | | | | 307/130 |
| 2016/0322830 | A1 * | 11/2016 | Ramorini | H02M 3/04 |

OTHER PUBLICATIONS

Li et al.; Switched-Capacitor Step-Down Rectifier for Low-Voltage Power Conversion; 2013 IEEE Applied Power Electronics Conference (APEC 13), Long Beach CA, Mar. 2013; 9 pages.

* cited by examiner

*Primary Examiner* — Emily P Pham
(74) *Attorney, Agent, or Firm* — Vierra Magen Marcus LLP

(57) ABSTRACT

The disclosure relates to a rectifier having a mirror image left/right side topology. Each side has a down-converter connected to half of a full bridge rectifier, and is switched 180 degrees out of phase with the other side. The sides of the full bridge rectifier have switches to rectify an alternating current signal into rectified signals, and a first capacitor to store a first charge of a rectified signal. Each of the down-converting circuits is connected to a first capacitor, has a second capacitor to store a second charge of the rectified signal, and switches to down-convert a voltage value of the first plus second charges to a direct current signal with a smaller voltage value. A controller circuit switches the switches on and off at times that are asynchronous with times of sign changes of the AC signal to reduce harmonics at the input of the rectifier.

20 Claims, 13 Drawing Sheets

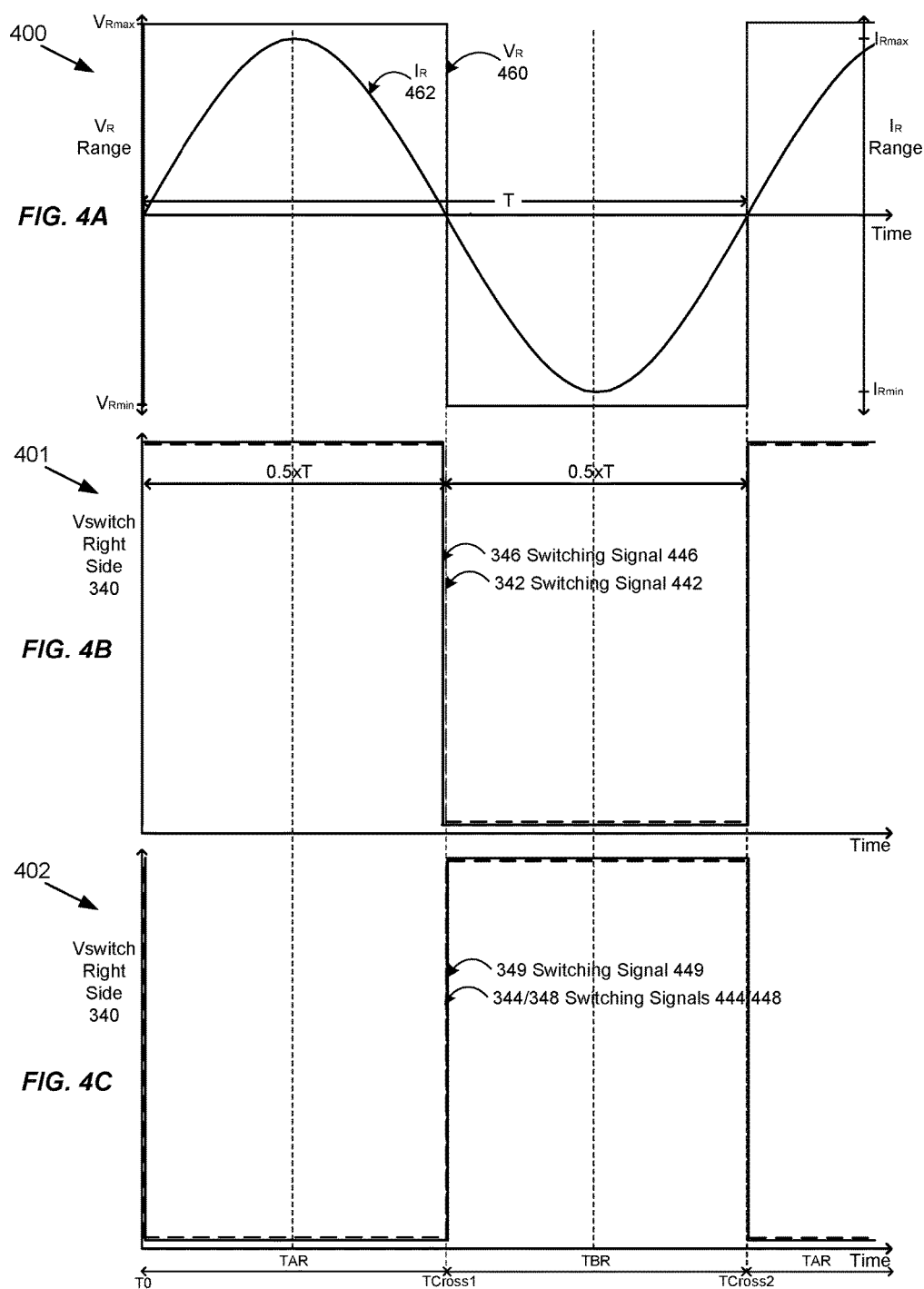

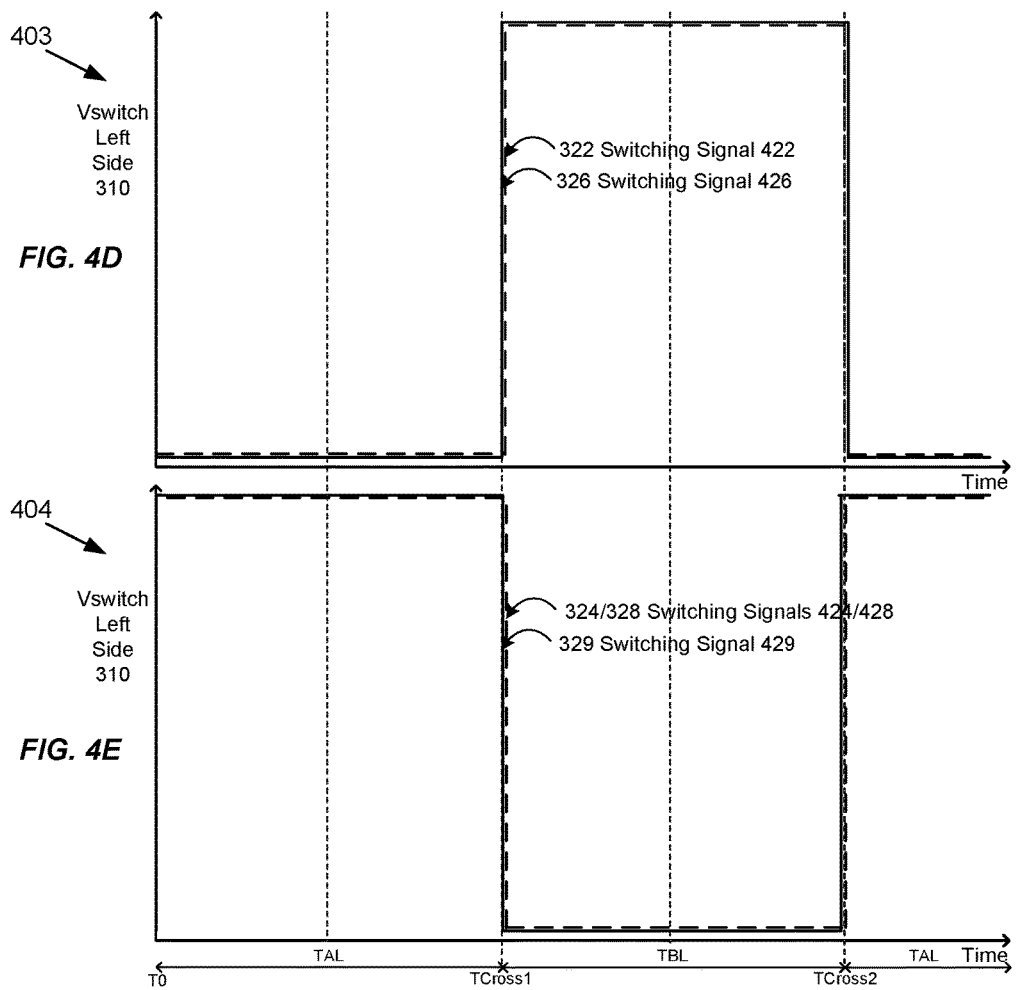

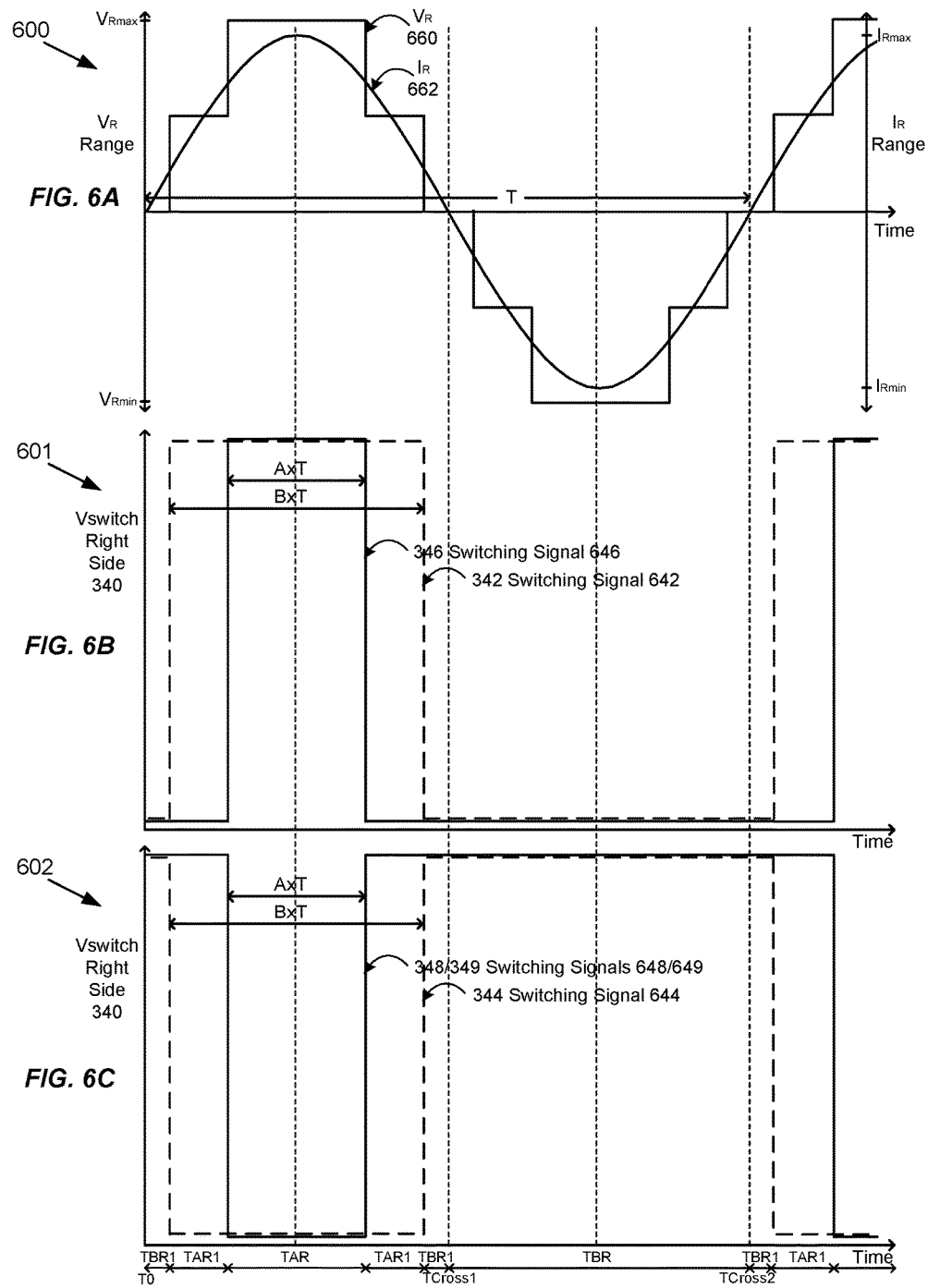

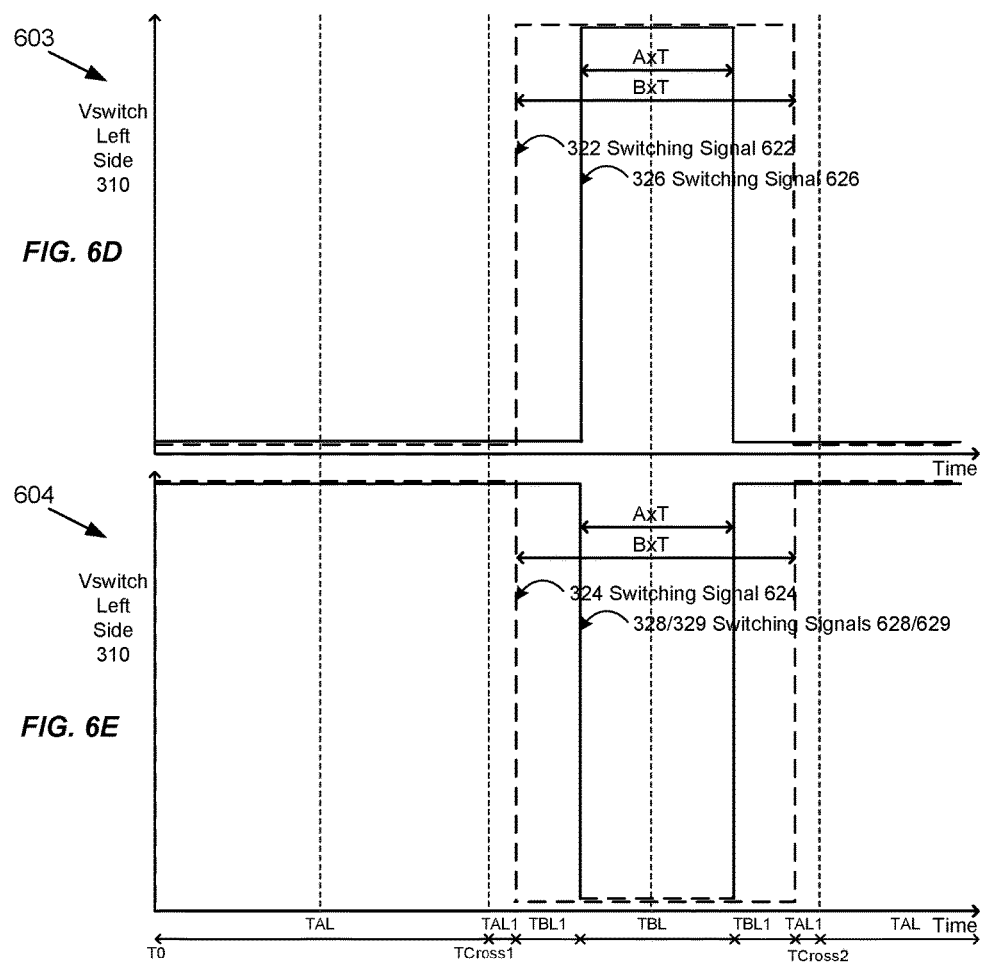

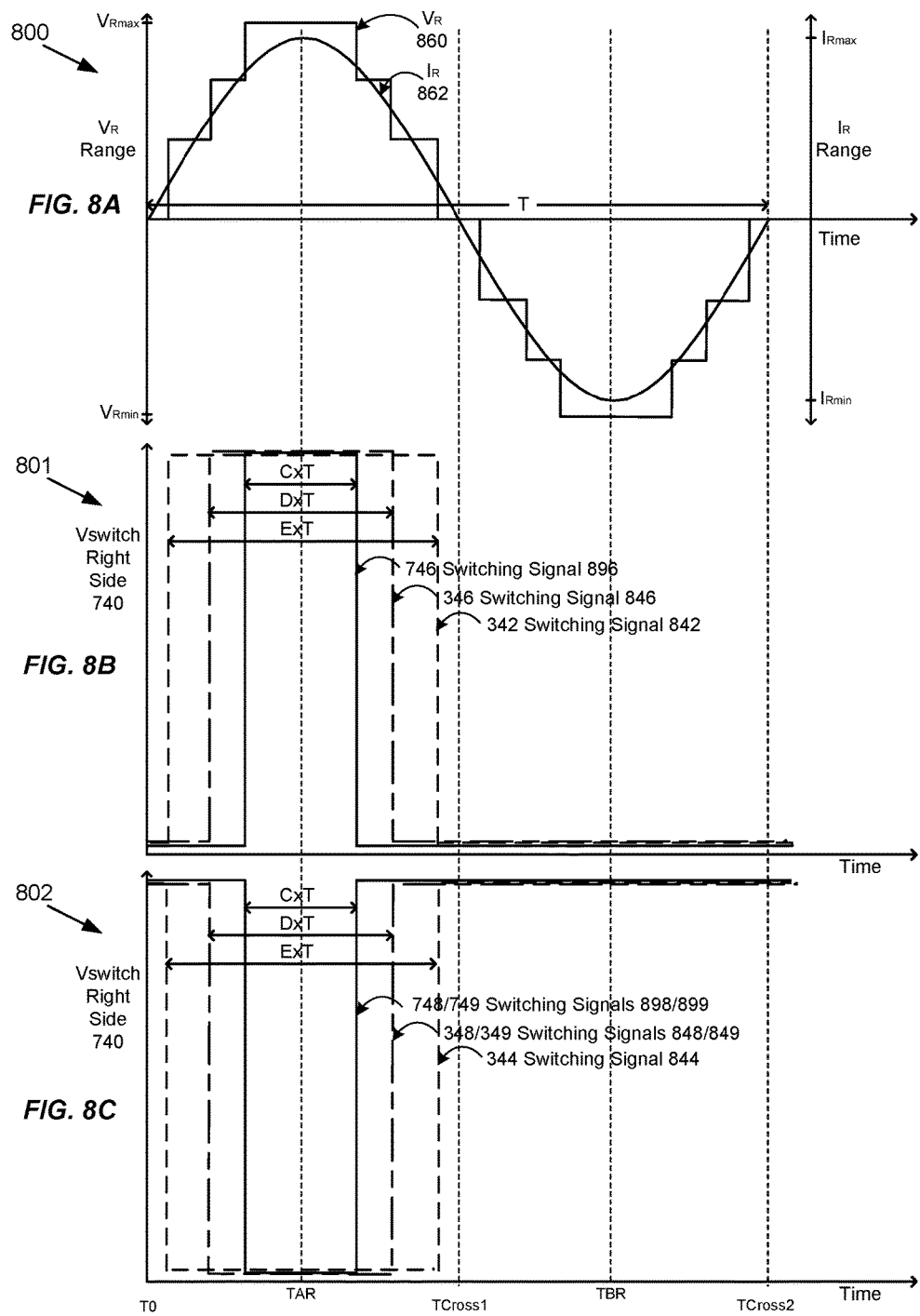

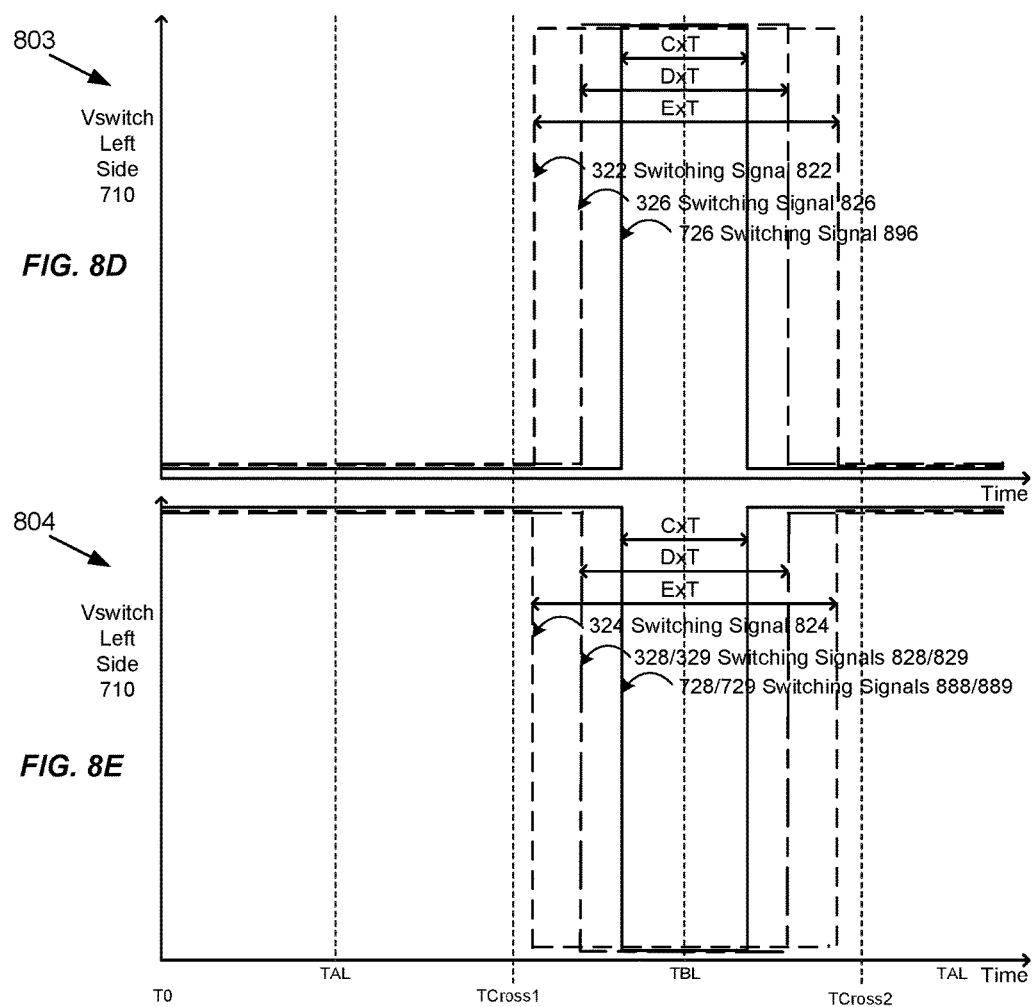

LOW HARMONIC DOWN-CONVERTING RECTIFIER FOR WIRELESS POWER TRANSFER RECEIVER

FIELD

The disclosed technology relates to reducing harmonics during rectifying and down converting of an alternating current (AC) input signal of a wireless power transfer system.

BACKGROUND

Wireless power transfer and charging are emerging technologies for consumer electronic devices, such as smart phones, smart watches, etc. A current trend of development in wireless power technology is to increase the transfer power such that the smart devices can be charged more quickly. However, there are some major limitations for delivering more power wirelessly, such as heat dissipation in the mobile device and electromagnetic interference (EMI) radiation emitted by the wireless power receiver coil. Given these limitations, current devices are not able to produce a wireless charging solution beyond about 10 Watts.

To reduce the thermal loss, down-converting circuitry can be added to the receiver to lower the receiver coil current. A down converter can reduce the voltage from the output of the rectifier while boosting the current presented to the battery charger of a wireless charging system. This conversion allows the same power to be delivered to the receiver while at the same time, reducing the thermal dissipation or loss from the coil into the rest of the device. However, the added down converter raises the impedance presented to the power conversion stages, which in turn lowers the system's quality factor (Q) and increases the system's EMI radiation emissions from the receiver coil. Accordingly, it would be valuable to have a wireless power transfer receiver that reduces heat dissipation and EMI radiation simultaneously.

BRIEF SUMMARY

According to one aspect of the present disclosure, there is provided a combined down-converting rectifier having a mirror topology, comprising: two sides of a full bridge rectifier circuit, each having rectifying switches to rectify voltages of an alternating current (AC) signal into two rectified signals, and a first capacitor to store a first charge of one of the two rectified signals; two down-converting circuits each connected to one of the first capacitors, each having a second capacitor to store a second charge of the one of the rectified signal, and down-converting switches to down-convert a voltage value of the first charge and the second charge to a direct current (DC) signal having a voltage value that is less than the voltage value of the first charge plus the second charge; and a controller circuit connected to the rectifying switches and to the down-converting switches to switch on and off the rectifying switches and the down-converting switches at times that are asynchronous with times of sign changes of an electrical current value of the AC signal.

Optionally, in any of the preceding aspects, another implementation of the aspect provides that the rectifier includes wherein the controller circuit is to control switching of the rectifying switches and of the down-converting switches to configure one of the two first capacitors and one of the second capacitors in series to store the first charge and the second charge of a rectified signal; and to configure another of the two first capacitors and another of the second capacitors in parallel to discharge a stored first charge and a stored second charge.

Optionally, in any of the preceding aspects, another implementation of the aspect provides that the rectifier includes wherein the AC signal is received from an induction coil of a wireless power receiver; the DC signal has a voltage value that is half of the voltage value of the first charge plus the second charge; and the controller circuit has output circuitry to control switching of the rectifying switches and of the down-converting switches to cause the AC signal to present a multi-level input voltage waveform having at least five different voltage levels.

Optionally, in any of the preceding aspects, another implementation of the aspect provides that the rectifier includes wherein the controller circuit is to control switching of the rectifying switches and of the down-converting switches to switch on and off for durations that are between 5 percent and 65 percent greater than or less than half of a period of the AC signal.

Optionally, in any of the preceding aspects, another implementation of the aspect provides that the rectifier includes wherein the down-converting circuits are first down-converting circuits; and further comprising two second down-converting circuits: each connected to one of the first down-converting circuits, each having a third capacitor to store a third charge of one of the two rectified signals, and second down-converting switches to down-convert a voltage value of the first charge, the second charge and the third charge to a DC signal having a voltage value that is one third of the voltage value of the first charge plus the second charge plus the third charge; and wherein the controller circuit: is connected to the second down-converting switches, and is to switch on and off the second down-converting switches at times that are asynchronous with the times of the sign changes of the electrical current value of the AC signal.

Optionally, in any of the preceding aspects, another implementation of the aspect provides that the rectifier includes wherein the controller circuit is to control switching of the second down-converting switches to switch on and off for durations that are between 5 percent and 65 percent greater than or less than half of a period of the AC signal.

Optionally, in any of the preceding aspects, another implementation of the aspect provides that the rectifier includes wherein the controller circuit is to control switching of the down-converting switches such that each of the two down-converting circuits maintain a voltage value of the first charge and the second charge to be that of the voltage value of the one of the two rectified signals.

Optionally, in any of the preceding aspects, another implementation of the aspect provides that the rectifier includes wherein the two down-converting circuits each have an output to receive a DC signal having a DC voltage value, and each (1) store a third charge of the DC signal in the second capacitor, (2) store a fourth charge of the DC signal in the first capacitor and (3) up-convert a voltage value of the third charge and the fourth charge into an up-converted signal having a voltage value that is twice of the voltage value of the third charge or the fourth charge; and the full bridge rectifier circuit rectifying switches are to invert voltages of the up-converted signal into an AC signal to be output on an induction coil.

Optionally, in any of the preceding aspects, another implementation of the aspect provides that the rectifier includes wherein the controller circuit is to control switching of the rectifying switches to: rectify voltages of a first AC signal having a first frequency into two rectified signals, and store a first charge of one of the two rectified signals of the first AC signal in the first capacitor, or rectify voltages of a second AC signal having a different second frequency into two rectified signals, and store a first charge of one of the two rectified signals of the second AC signal in the first capacitor; and the controller circuit is to control switching of the down-converting switches to: (1) store a second charge of the one of the two rectified signals of the first AC signal in the second capacitor, or store a second charge of the one of the two rectified signals of the second AC signal in the second capacitor; and (2) down-convert a voltage value of the first charge and the second charge to a DC signal having a voltage value that is half of the voltage value of the first charge plus the second charge.

According to one aspect of the present disclosure, there is provided a combined down-converting rectifier having a mirrored topology, comprising: two sides of a full bridge rectifier circuit, each having two sets of rectifying switches to rectify voltages of an alternating current (AC) signal into two rectified signals; two down-converting circuits, each connected to one of the two sets of rectifying switches, each of the two down-converting circuits having (1) a first capacitor to store a first charge of one of the two rectified signals and a second capacitor to store a second charge of one of the two rectified signals, and (2) down-converting switches to down-convert a voltage value of the first charge and the second charge to a direct current (DC) signal having a voltage value that is less than the voltage value of the first charge plus the second charge; and a controller circuit connected to the rectifying switches and to the down-converting switches to switch on and off the rectifying switches and the down-converting switches at times that are asynchronous with times of sign changes of an electrical current value of the AC signal.

Optionally, in any of the preceding aspects, another implementation of the aspect provides that the rectifier includes wherein the controller circuit is to control switching of the rectifying switches and of the down-converting switches to configure one of the first capacitors and one of the second capacitors in series to store the first charge and the second charge of a rectified signal; and to configure another of the first capacitors and another of the second capacitors in parallel to discharge a stored first charge and a stored second charge.

According to one aspect of the present disclosure, there is provided a method for combining down-converting and rectifying of a mirror topology rectifier, comprising: switching rectifying switches of two sides of a full bridge rectifier circuit to rectify voltages of an alternating current (AC) signal into two rectified signals, and to store a first charge of one of the two rectified signals in a first capacitor; and switching down-converting switches of two down-converting circuits each connected to a first capacitor, each having down-converting switches and a second capacitor to (1) store a second charge of the one of the two rectified signals, and (2) to down-convert a voltage value of the first charge and the second charge to a direct current (DC) signal having a voltage value that is less than the voltage value of the first charge plus the second charge; wherein switching the rectifying switches and the down-converting switches includes switching on and off the rectifying switches and the down-converting switches at times that are asynchronous with times of sign changes of an electrical current value of the AC signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 4A illustrates an example of input voltage and current signals for the combined down-converting rectifier of FIG. 2, according to example embodiments.

FIG. 4B-C illustrate examples of switching signals for the right side of the combined down-converting rectifier of FIG. 2, according to example embodiments.

FIG. 4D-E illustrate examples of switching signals for the left side of the combined down-converting rectifier of FIG. 2, according to example embodiments.

FIG. 6A illustrates another example of input voltage and current signals for the combined down-converting rectifier of FIG. 2, according to example embodiments.

FIG. 6B-C illustrate more examples of switching signals for the right side of the combined down-converting rectifier of FIG. 2, according to example embodiments.

FIG. 6D-E illustrate more examples of switching signals for the left side of the combined down-converting rectifier of FIG. 2, according to example embodiments.

FIG. 8A illustrates an example of input voltage and current signals for the combined down-converting rectifier of FIG. 7, according to example embodiments.

FIG. 8B-C illustrate examples of switching signals for the right side of the combined down-converting rectifier of FIG. 7, according to example embodiments.

FIG. 8D-E illustrate examples of switching signals for the left side of the combined down-converting rectifier of FIG. 7, according to example embodiments.

DETAILED DESCRIPTION

The disclosed technology relates to a combined down-converting rectifier topology and a control process that reduce the harmonics produced in a wireless power receiver coil of a wireless power transfer system attached to the combined rectifier. The combined rectifier has a mirror topology with mirror image left and right sides, each side having as an input, a side of a full bridge rectifier circuit that is in turn connected to a down-converting circuit for output. The switches of each side are switched 180 degrees out of phase with the other side.

The sides of the full bridge rectifier circuit have rectifying switches to rectify voltages of an alternating current (AC) signal into two rectified signals; and a first capacitor to store a first charge of one of the two rectified signals. Each of the down-converting circuits is connected to a first capacitor, and has a second capacitor to store a second charge of the rectified signal. Each of the down-converting circuits also has down-converting switches to down-convert a voltage value of the first charge and the second charge to a direct current (DC) signal having a voltage value that is less than the voltage value of the first charge plus the second charge.

A controller circuit of the combined rectifier is connected to the rectifying switches and to the down-converting switches to switch them on and off at times that are asynchronous with times of sign changes of an electrical current value of the AC signal. These switching times can be strategically chosen so that the waveform of the input voltage to the combined rectifier more closely matches a sine wave as compared to a square wave. This reduces the electromagnetic interference (EMI) radiation emitted by the receiver coil attached to the input, reduces undesired heat that is dissipated from the coil into components of the device, and increases the amount of power that can be transferred through the system. Consequently, the combined down-converting rectifier topology and control process can enable fast wireless charging of an electronic device.

Figure 1:
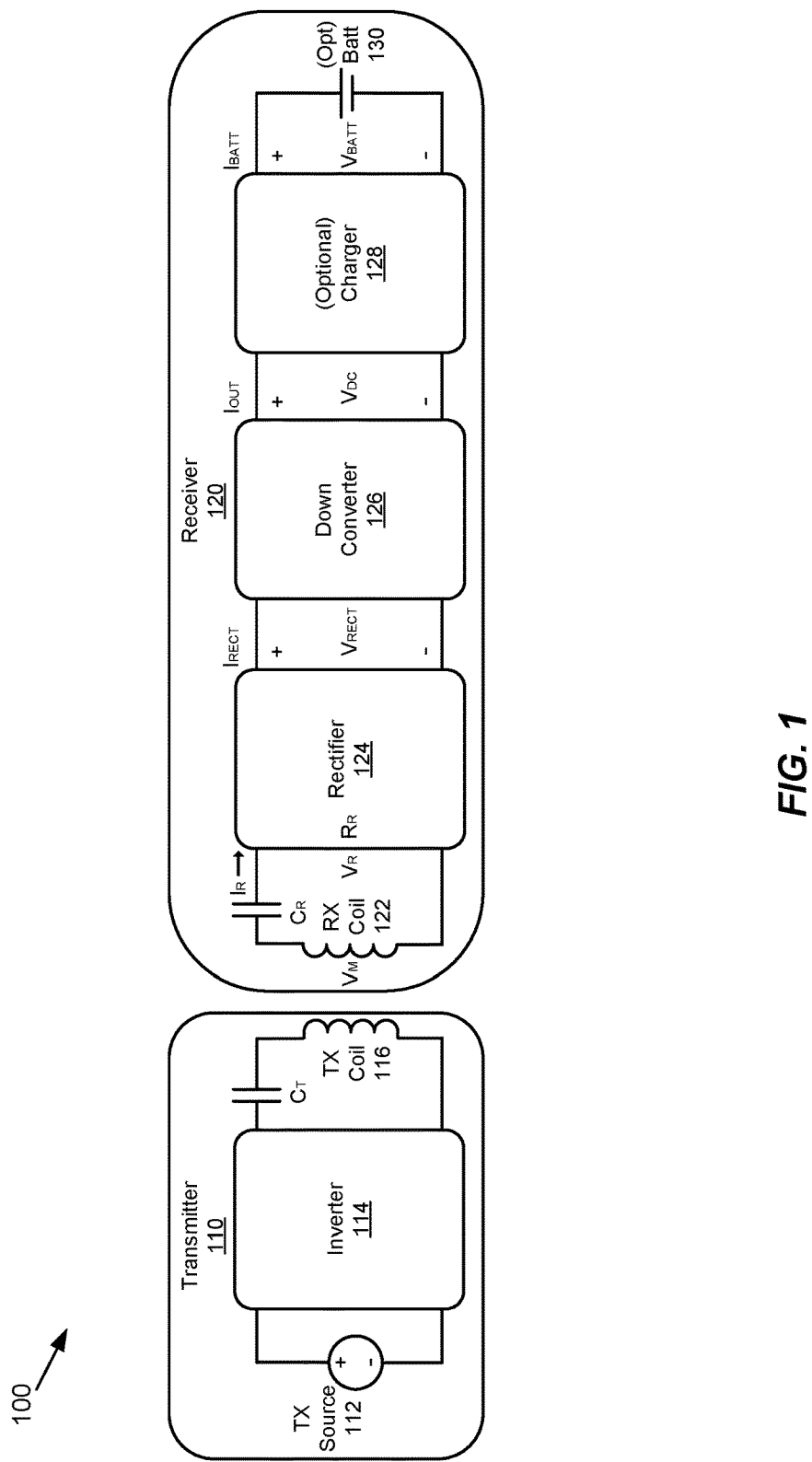
FIG. 1 illustrates an example of a wireless power transfer system, according to example embodiments.

FIG. 1 illustrates an example of a wireless power transfer system 100, according to example embodiments. According to embodiments, system 100 may be described as a magnetic field based wireless power transfer system that leverages electromagnetic induction from coil 116 to coil 122 to transfer energy wirelessly from transmitter 110 to receiver 120. For example, transmitter 110 may be a wireless charger of an electronic mobile device and receiver 120 may be a wireless power transfer system for that mobile device. In some instances, receiver 120 may (optionally) be a wireless battery charger.

System 100 has wireless power transmitter 110 with DC transmitter power source 112 sending DC power as an input to inverter 114 which converts that power to an AC power signal that is output through capacitor $C_T$ and drives transmitter coil 116. Coil 116 converts the AC power signal current to an alternating magnetic field having an AC voltage. That is, coil 116 may transmit the AC signal from the inverter as wireless power having AC voltage that is received by receiver coil 122 of receiver 120 as explained below. In some embodiments, $C_T$ is used to compensate or tune the inductance at coil 116 to resonance at a frequency at or near the switching frequency desired for the alternating magnetic field output by the coil. In one instance, coil 116 is an electromagnetic induction coil for transmitting wireless power.

System 100 also has wireless power receiver 120 with AC wireless power receiver coil 122, such as for converting the alternating magnetic field that is output by coil 116 into an AC electrical signal having voltage $V_M$. In one instance, coil 122 is an electromagnetic induction coil for receiving wireless power. The electrical AC signal having voltage $V_M$ may be output through capacitor $C_R$ and input as an AC electrical current $I_R$ into receiver rectifier circuitry or "rectifier" 124. Current $I_R$ may contain a primarily sinusoidal signal at the operating frequency and some harmonic contents at harmonic frequencies. For example, voltage source $V_M$ may represent the induced voltage from the source on the inductor coil 122, while voltage $V_R$ represents the voltage across the inductor coil 122 and capacitor $C_R$. Voltage $V_R$ may have a waveform rich in harmonic contents due to the switching operation of the rectifier, which in turn produces harmonics in current $I_R$. In some instances, capacitor $C_R$ is used to compensate or tune the inductance at coil 122 to a resonance frequency at or near the switching frequency of voltage $V_R$ or current $I_R$ (e.g., see FIGS. 4A, 6A and 8A where this frequency is 1/T).

At times, the signal received as an input by rectifier 124 from coil 122 (and optionally through capacitor $C_R$) has positive current $I_R$ at one input (e.g., the top input) of the rectifier when coil 122 is outputting the positive polarity part of the AC signal that causes positive voltage $V_R$. At other times, the signal received as an input by rectifier 124 from coil 122 has negative current $I_R$ at a second input (e.g., the bottom input) of the rectifier when coil 122 is outputting the negative polarity part of the AC signal that causes negative voltage $V_R$. Rectifier 124 may have impedance or resistance $R_R$ across those inputs of rectifier 124 when receiving the AC signal with voltage $V_R$.

Rectifier 124 converts the positive and negative polarity parts of the received AC signal with voltage $V_R$ and current $I_R$ into two rectified signals having DC current $I_{RECT}$ and DC voltage $V_{RECT}$ which are inputs to down converter 126. In one instance, the rectifier 124 is a full bridge rectifier that outputs a positive polarity rectified signal having current $I_{RECT}$ and voltage $V_{RECT}$ across the output terminals to the input of converter 126 when $V_R$ is positive, and that outputs a positive polarity rectified signal having current $I_{RECT}$ and voltage $V_{RECT}$ across the output terminals to the input of converter 126 when $V_R$ is negative.

Down converter 126 converts the received rectified signals into a single DC signal with voltage $V_{DC}$ which is less than voltage $V_{RECT}$, and with current $I_{OUT}$, which is greater than current $I_{RECT}$. This single DC signal may be received as an input by charger 128. In one instance, down converter 126 is a 2:1 converter that converts $V_{RECT}$ to output $V_{DC}$ which is half of $V_{RECT}$; and that converts $I_{RECT}$ to output $I_{OUT}$ which is twice of $I_{RECT}$. In another case, it is a 3:1 converter that converts $V_{RECT}$ to output $V_{DC}$ which is a third of $V_{RECT}$; and that converts $I_{RECT}$ to output $I_{OUT}$ which is three times $I_{RECT}$. It can be appreciated that converter 126 may be expanded to be an N:1 converter, such as described below for FIG. 9.

Some embodiments of system 100 include optional charger 128 and battery 130, such as where system 100 includes or is a wireless power charging system to charge the battery. Charger 128 converts the received down-converted signals into a DC signal with voltage $V_{BATT}$ and current $I_{BATT}$, which may be received as an input to charge optional battery 130. In one instance, charger 128 is a DC to DC converter that conditions the DC input voltage $V_{DC}$ to $V_{BATT}$ to be proper for charging a battery.

Some challenges in implementing receiver 120 in a mobile device are avoiding the thermal dissipation from the receiver 120 and into the components of the device, and the EMI radiation emitted by the receiver coil 122 that are caused by the receiver when it is receiving wireless power. The thermal dissipation may be primarily dominated by Ohmic loss in the receiver coil 122, where the total heat generated is proportional to the square of coil current $I_R$. In other words, the passage of electrical current $I_R$ through coil 122 may produce an amount of heat proportional to $R_R \times I_R^2$. On the EMI side, harmonic frequencies are generated by rectifier 124, and the coil 122 behaves like an effective antenna to radiate those harmonic frequencies out to cause wireless EMI radiation emissions, such as emissions of an electromagnetic wave with amplitude proportional to the harmonics.

Figure 2:
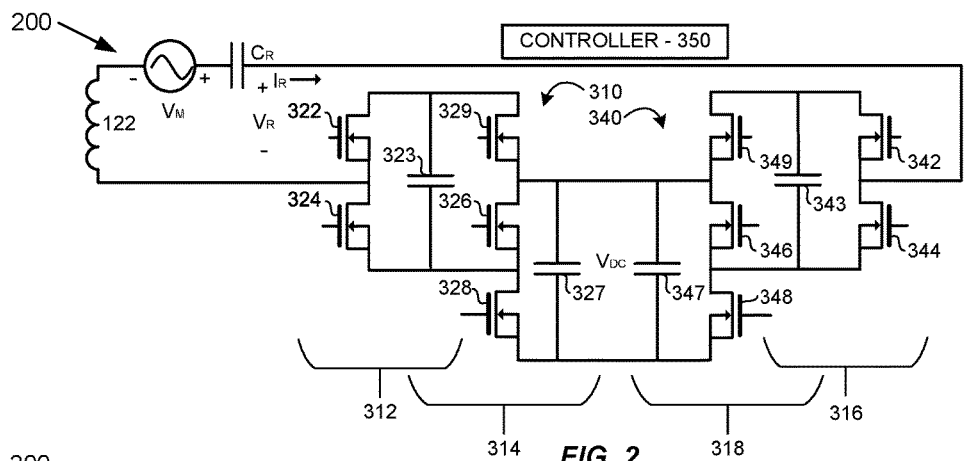
FIG. 2 illustrates an example of a combined down-converting rectifier, according to example embodiments.

According to embodiments, the two wireless power receiver functions of rectifier 124 and down converter 126 can be combined into one circuit block that includes switches that can be controlled by a controller. The circuit block can be a combined down-converting rectifier that uses switched capacitor circuits in conjunction with an active rectifier. For example, FIG. 2 illustrates an example of a combined down-converting rectifier 200, according to example embodiments. Combined rectifier 200 is shown having receiver coil 122, capacitor $C_R$ and voltage $V_R$ and current $I_R$, such as described for FIG. 1. Voltage $V_R$ and current $I_R$ are inputs to left half (or side) 310 and right half (or side) 340 of the mirror image topology of combined rectifier 200.

Left side 310 of the mirror image topology is shown having first part 312 of a full rectifier having a set of rectifying switches 322 and 324. First part 312 is able to rectify voltages of a negative part of an AC signal having voltage $V_R$ into a rectified signal. In one instance, first part 312 also has first capacitor 323 to store a first charge of the rectified signal received from rectifying switches 322 and 324.

Left side 310 is also shown having a down-converting circuit connected to first part 312. In some cases, circuit 314 may be described as being connected to or across first capacitor 323. In these cases, circuit 314 may be described as including (1) second capacitor 327 to store a second charge of the rectified signal from first part 312; and (2) down-converting switches 326, 328 and 329 to down-convert a voltage value of the first charge stored in first capacitor 323 and the second charge stored in second capacitor 327. In this case, the voltages from capacitors 323 and 327 may be down-converted to a direct current (DC) signal having voltage value $V_{DC}$ that is less than the voltage value of the first charge plus the second charge. In one instance $V_{DC}$ is half of the voltage value of the first charge plus the second charge.

Right side 340 of the mirror image topology is shown having second part 316 of a full rectifier (e.g., having parts 312 and 316) having a set of rectifying switches 342 and 344 to rectify voltages of a positive part of the AC signal having voltage $V_R$ into a rectified signal. In one instance, second part 316 also has first capacitor 343 to store a first charge of the rectified signal received from rectifying switches 342 and 344.

Right side 340 is also shown having down-converting circuit 318 connected to second part 316. In some cases, circuit 318 may be described as being connected to or across first capacitor 343. In these cases, circuit 318 may be described as including (1) second capacitor 347 to store a second charge of the rectified signal from second part 316; and (2) down-converting switches 346, 348 and 349 to down-convert a voltage value of the first charge stored in first capacitor 343 and the second charge stored in second capacitor 347. In this case, the voltages from capacitors 343 and 347 may be down-converted to a direct current (DC) signal having voltage value $V_{DC}$ that is less than the voltage value of the first charge plus the second charge. In one instance $V_{DC}$ is half of the voltage value of the first charge plus the second charge.

When $V_R$ is positive, current $I_R$ flows into right side 340 between switches 342 and 344 as shown by the positive or "+" signal path; and when $V_R$ is negative, current $I_R$ flows into left side 310 between switches 322 and 324 as shown by the negative or "−" signal path. According to embodiments, descriptions for or functions of rectifier 124 and down-converter 126 can be combined into down-converting rectifier 200.

Combined rectifier 200 is shown having a controller circuit or "controller" 350 connected to the rectifying switches 322, 324, 342 and 344; and connected to the down-converting switches 326, 328, 329, 346, 348 and 349 to switch on and off the rectifying switches and the down-converting switches. For example, the controller may be connected by one or more signal lines (not shown) to each of the switches. In the case where the switches are transistors, the controller may be connected by a signal line, wire or trace to the gate of each of the switches. Controller 350 may include a microcontroller, integrated circuit (IC), logic, software, and/or hardware that is capable of providing switching signals to switch switches 322-349 on and off. For example, controller 350 may have output circuitry that sends signals along the signal lines to control switching of the rectifying switches and of the down-converting switches. In some instances, controller 350 includes one or more circuits that generate a pulse width modulated (PWM) switching signal and such signal can be level shifted to drive the switches to turn them on and off.

In one instance, the timing and duty cycle of the switching signals sent by controller 350 may be synthesized internal to the controller circuitry. In one case, controller 350 is an IC which is programmable using software. In this case, special circuitry or hardware may not be needed to control the switches, simple software control may be enough.

For some embodiments, controller 350 is able to sense the transition of current signal $I_R$ across zero (e.g., see FIG. 4A) and output switching signals 422, 424, 426, 428, 429, 442, 444, 446, 448 and 449 as shown in FIGS. 4B-E to synchronize the timing of switching switches 322-349 to be at certain times relative to those crossings.

Switches 322-349 may be metal oxide semiconductor (MOS) field effect transistors (FETS). However, these switches may be any of various types of switches that can be programmed or controlled by controller 350 or 750 to switch at certain times with respect to voltage levels of voltage VR or current levels of current IR. In some cases they may be NMOSFETS, PMOSFETS, or other switches that are switched with respect to the timing of when current levels of current IR cross zero, from positive to negative and vice versa (e.g., see switches of FIGS. 3A-B, 5A-D and 7).

According to embodiments, combined rectifier 200 may be described as having left side 310 that includes two functional blocks, (1) a rectifier stage shown as first part 312 that converts AC input current $I_R$ to a DC voltage that is stored as charges in capacitors 232 and 237; then (2) a 2:1 down-converting circuit shown as second circuit 314 that is added following first part 312, to down-convert the voltage to half of the stored charge values. The same two structures can be mirrored to right side 340 to make the design into full wave combined down-converting rectifier 200.

In some cases, combined rectifier 200 includes or has an electrical "load" impedance or resistance across the location shown for voltage $V_{DC}$, such as between and in parallel with capacitors 327 and 347. In some cases, the load is where the DC output of voltage $V_{DC}$ provides power and has an impedance that is equivalent in electrical resistance to the battery 130 or charger 128. For example, such a load may be connected externally to the location shown across voltage $V_{DC}$. The existence of this load may be used when describing certain configurations or power flows of combined rectifier 200. For example, this load will be referred to below with respect to FIGS. 3-6E.

Figure 3A:
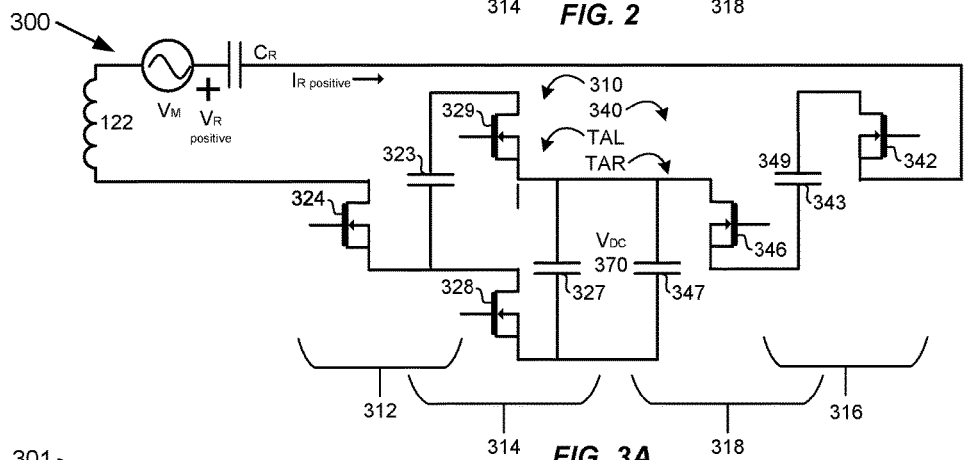
FIG. 3A illustrates an example of positive voltage signal paths for the combined down-converting rectifier of FIG. 2, according to example embodiments.
Figure 3B:
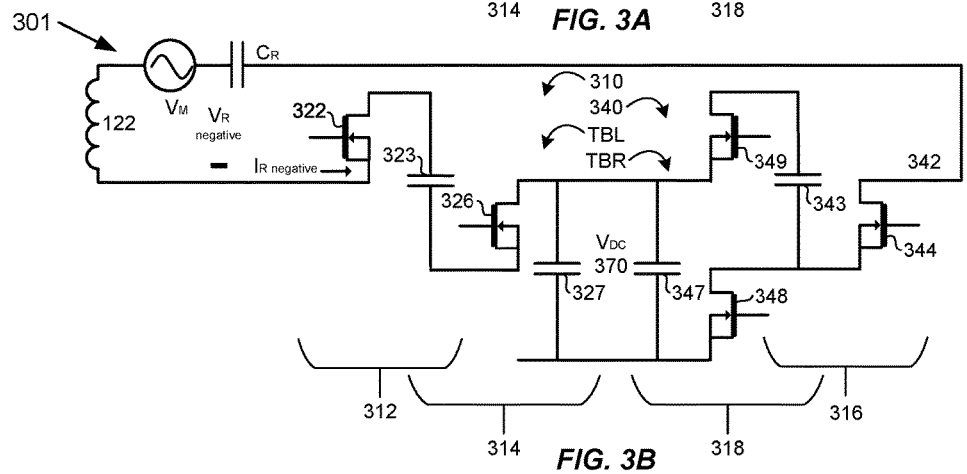
FIG. 3B illustrates an example of negative voltage signal paths for the combined down-converting rectifier of FIG. 2, according to example embodiments.

In more detail, in some cases, left side 310 receives the negative current $I_R$ of the input AC voltage $V_R$ and creates a signal path using switches 322-329; and right side 340 receives the positive current $I_R$ of the input AC voltage $V_R$ and creates a signal path using mirrored switches 342-349 that each switch 180 degrees out of phase with their mirrored partner of switches 232-239 of the left side. For example, FIG. 3A illustrates example 300 of positive voltage $V_R$ signal paths TAL and TAR for the combined down-converting rectifier 200 of FIG. 2, according to example embodiments. Also, FIG. 3B illustrates example 301 of negative voltage $V_R$ signal paths TBL and TBR for the combined down-converting rectifier 200 of FIG. 2, according to example embodiments.

Next, FIG. 4A illustrates example 400 of input voltage $V_R$ signal 460 and current $I_R$ signal 462 to the combined down-converting rectifier 200 of FIG. 2, according to example embodiments. FIGS. 4B-C illustrate examples 401 and 402, respectively, of switching signals 442-449 for creating signal paths TAR and TBR for the right side 340 of the combined down-converting rectifier 200 of FIG. 2, according to example embodiments. In addition, FIGS. 4D-E illustrate examples 403 and 404, respectively, of switching signals 422-429 for creating signal paths TAL and TBL for the left side 310 of the combined down-converting rectifier 200 of FIG. 2, according to example embodiments. In one instance, switching signals 422-449 are output by controller 350 to turn switches 322-349 on and off at certain times relative to when current IR crosses zero.

It is noted that the turned off switches of switches 322-349 of examples 300-301 are not shown since they are open circuits and no signal flows through them. Also, the turned on switches of switches 322-349 of examples 300-301 are shown as symbols with their gates touching their source and drain to indicate that they are short circuits and signal does flow through them. Showing the turned on switches of switches 322-349 as symbols with their gates touching their source and drain may be a non-conventional indication of MOSFET being switched on, but is being used to indicate that the source is shorted to the drain, forming a short circuit through the transistor (e.g., from the top to the bottom of each switch as shown).

Signals 400 show an AC electrical signal having AC electrical current $I_R$ 462 and AC electrical voltage $V_R$ 460 that are inputs into combined rectifier 200. AC current $I_R$ 462 and voltage $V_R$ 460 have a period of T and a frequency of 1/T. As shown, current $I_R$ 462 is primarily a sine wave with operating frequency and having current values in a range between a maximum current value of $I_{Rmax}$ and a minimum current value of $I_{Rmin}$. Current IR 462 crosses zero at times T0, TCross1 and TCross2. As shown, voltage VR 460 is a primarily a square wave having voltage values in a range between a maximum voltage value of $V_{Rmax}$ and a minimum voltage value of $V_{Rmin}$. Voltage VR 460 crosses zero and switches between values $V_{Rmax}$ and $V_{Rmin}$ at times T0, TCross1 and TCross2.

Signal paths of examples 300-301 as shown in FIGS. 3A-B may be caused by switching switches 322, 324, 326, 328, 329, 342, 344, 346, 348 and 349 of FIG. 2 using switching signals 422, 424, 426, 428, 429, 442, 444, 446, 448 and 449, respectively, at times as shown for signals of examples 401-404 of FIGS. 4B-4E, that are synchronous with times of sign changes of the value of current IR 462 as shown in FIG. 4A.

According to embodiments, the output of switches 342 and 344 will be a rectified version of the positive bias version of AC current $I_R$ 462 and AC voltage $V_R$ 460 when those signals are positive values above zero as shown in FIG. 4A. In other words, the values above zero of AC current $I_R$ 462 and AC voltage $V_R$ 460 shown in FIG. 4A will be rectified to be a rectified signal having positive corresponding values when rectified by switches 342 and 344. This rectified signal will be the input from switch 342 into signal path TAR; or to capacitors 343 and 347 in series during Time between T0 and TCross1. As a result, after TCross1, the addition of the voltages of the charges stored in capacitors 343 and 347 in series will be $\pi/4$ times value $V_{MAX}$, where value $V_{MAX}$ represent the amplitude of the fundamental frequency content of voltage $V_R$.

According to embodiments, the output of switches 322 and 324 will be a rectified version or positive bias version of AC current $I_R$ 462 and voltage $V_R$ 460 when those signals are negative values below zero as shown in FIG. 4A. In other words, the values below zero of AC current $I_R$ 462 and AC voltage $V_R$ 460 shown in FIG. 4A will be rectified to be a rectified signal having positive corresponding or mirror image values when rectified by switches 322 and 324. This rectified signal will be the input from switch 342 into signal path TBL; or to capacitors 343 and 347 in series during Time between TCross1 and TCross2. As a result, after TCross2, the addition of the voltages of the charges stored in capacitors 343 and 347 in series will be $\pi/4$ times value $V_{MAX}$.

For example, during Time T0 to TCross1, voltage $V_R$ 460 and current $I_R$ 462 may be positive as shown in FIG. 4A. During this time, the signal paths of combined rectifier 200 may be paths TAL and TAR as shown in FIG. 3A due to switches 322-349 being switched on or off using signals 422-449, as shown in FIGS. 4B-4E.

As shown in FIGS. 3A and 4A-E, during Time T0 to TCross1, switches 342 and 346 are switched on while switches 344, 348 and 349 are switched off to create signal path TAR for right side 340, and thus the two capacitors 343 and 347 on the right side 340 charge in series with the rectified voltage out of switch 342. For example, this may charge each of capacitors 343 and 347 with less than the rectified voltage out of switch 342. In one instance, this may charge each of capacitors 343 and 347 with half of the rectified voltage out of switch 342.

Also, during Time T0 to TCross1, switches 322 and 326 are switched off while switches 324, 328 and 329 are switched on to create signal path TAL for left side 310, and thus the two capacitors 323 and 327 on the left side 310 discharge in parallel with the voltage of the charges stored in them to voltage $V_{DC}$ 370. In one case, discharging in parallel describes that the two capacitors discharge with a signal having a current that is twice current $I_R$, and with a voltage that is the same as the voltage of the charges stored in either capacitor which is a voltage that is proportional to half of voltage $V_R$. Discharge will be discuss further for time TCross1 to TCross2 below.

In addition, during Time TCross1 to TCross2, voltage $V_R$ 460 and current $I_R$ 462 may be negative as shown in FIG. 4A. During this time, the signal paths of combined rectifier 200 may be paths TBL and TBR as shown in FIG. 3B due to switches 322-349 being switched on or off using switching signals as shown in FIGS. 4B-4E.

As shown in FIGS. 3B and 4A-E, during Time TCross1 to TCross2, switches 322 and 326 are switched on while switches 324, 328 and 329 are switched off to create signal path TBL for left side 310, and thus the two capacitors 323 and 327 on the left side 310 charge in series with the rectified voltage out of switch 322. For example, this may charge each of capacitors 323 and 327 with less than the rectified voltage out of switch 322. In one instance, this may charge each of capacitors 323 and 327 with half of the rectified voltage out of switch 322.

Also, during Time TCross1 to TCross2, switches 342 and 346 are switched off while switches 344, 348 and 349 are switched on to create signal path TBR for right side 340, and thus the two capacitors 343 and 347 on the right side 340 discharge in parallel with the voltage of the charges stored in them to voltage $V_{DC}$ 370.

For example, this discharge to voltage $V_{DC}$ 370 may be less than the voltages of the charges stored in capacitors 343 and 347 added together; or less than the rectified voltage output by switch 342 during Time T0 to TCross1. In one instance, this discharge of voltage $V_{DC}$ 370 may be half of the voltages of the charges stored in both capacitors added together during Time T0 to TCross1. In this case, during time TCross1 to TCross2, right side 340 or circuit 318 may be acting as a 2:1 voltage down-converter by halving the input voltage stored in the capacitors during time T0 to TCross1.

Since the switches and capacitors switch roles depending on the polarity of the AC signal or current $I_R$ 462, one way to describe the combined rectifier 200 is as performing "rectifying" when the two capacitors of one side are charging in series, and performing "down-converting" when the two capacitors of that side are discharging in parallel.

As described above, switching signals 422-449 switch switches 322-349 on and off in FIGS. 4B-E at the same time as the AC current $I_R$ 462 crosses zero (from positive to negative and vice versa) in FIG. 4A. Switching at the same time the current crosses zero creates a square wave including 2 stepped jumps in voltage $V_R$ 460 up and down, over the full voltage range of voltage $V_R$ 460 as shown in FIG. 4A. These jumps create high levels of total harmonic distortion (THD). Since the harmonic contents in current $I_R$ are proportional to voltage $V_R$ 460, the harmonic contents in current $I_R$ flow through coil 122 that cause receiver 120 to emit undesired amounts if EMI radiation from coil 122.

Some embodiments described herein provide a better rectifier topology and down-converting circuit schedule in order to capture the benefit of rectifying and down-conversion while reducing system harmonics at the same time. For example, the multi-level down-converting architecture of combined rectifier 200 can be controlled in such a way that it produces less heat in the device and generates less harmonic radiations from the receiver coil at the same time. In this case, strategic control of the switch timing and duty cycle of switching the switches can create a multi-level rectified voltage waveform for voltage $V_R$, which in turn produces less harmonic currents at the receiving coil 122 and effectively reduces system EMI radiation emitted by that coil. In some cases, this solution is projected to be able to enable 15-20 Watt power wireless charging by receiver 120 without causing thermal or EMI issues.

More specifically, for some embodiments, controller 350 is able to sense the transition of signal $I_R$ across zero (e.g., see FIG. 6A) and output switching signals 622, 624, 626, 628, 629, 642, 644, 646, 648 and 649 to synchronize the timing of switching switches 322, 324, 326, 328, 329, 342, 344, 346, 348 and 349, respectively, to be at times that are asynchronous with times of sign changes of the electrical current value of current IR (e.g., see FIGS. 6B-E).

Figure 5A:
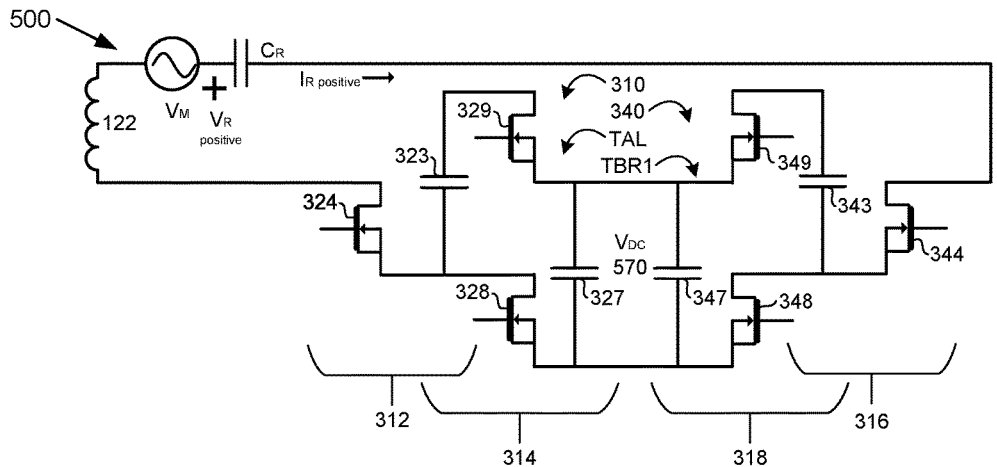
FIGS. 5A-B illustrate more examples of positive voltage signal paths for the combined down-converting rectifier 200 of FIG. 2, according to example embodiments.
Figure 5B:
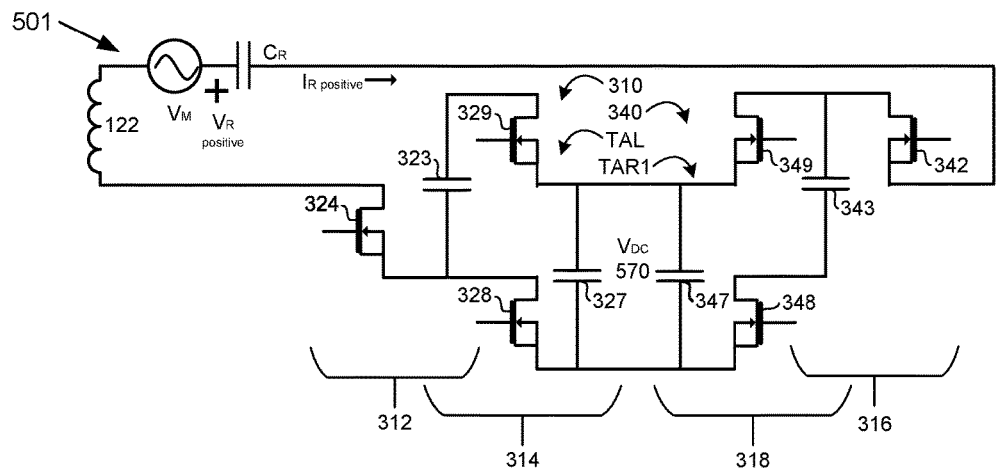
Figure 5C:
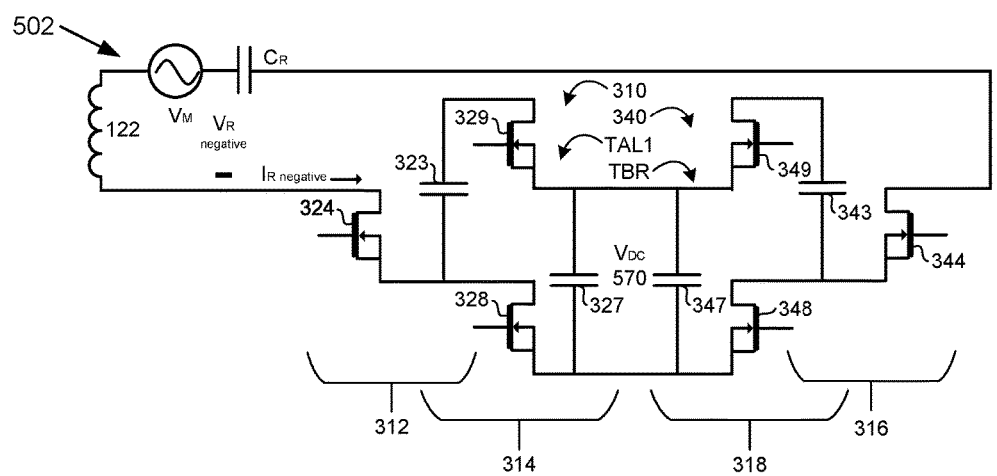
FIGS. 5C-D illustrate more examples of negative voltage signal paths for the combined down-converting rectifier 200 of FIG. 2, according to example embodiments.
Figure 5D:
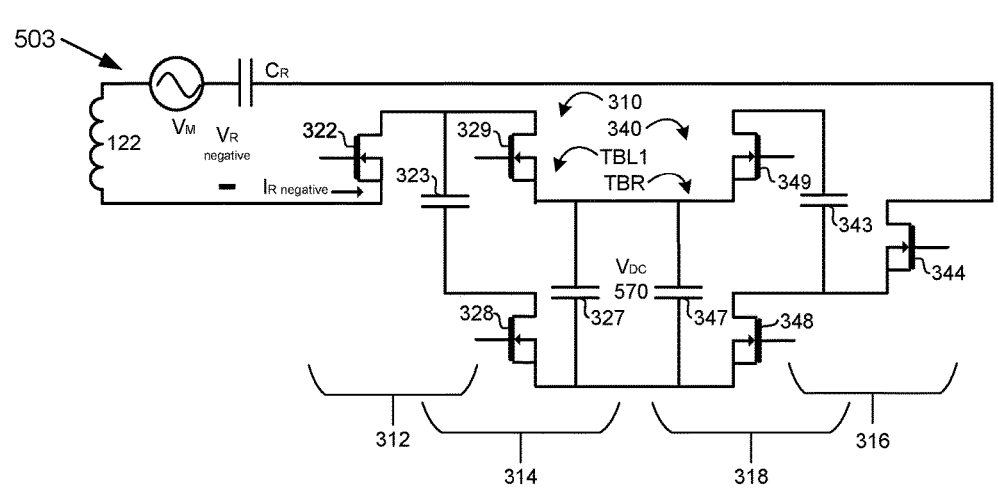

For example, FIG. 5A illustrates example 500 of positive voltage $V_R$ signal paths TAL and TBR1 for the combined down-converting rectifier 200 of FIG. 2, according to example embodiments. Also, FIG. 5B illustrates example 501 of positive voltage $V_R$ signal paths TAL and TAR1 for the combined down-converting rectifier 200 of FIG. 2, according to example embodiments. In addition, FIG. 5C illustrates example 502 of negative voltage $V_R$ signal paths TAL1 and TBR for the combined down-converting rectifier 200 of FIG. 2, according to example embodiments. Also, FIG. 5D illustrates example 503 of negative voltage $V_R$ signal paths TBL1 and TBR for the combined down-converting rectifier 200 of FIG. 2, according to example embodiments.

FIG. 6A illustrates an example 600 of input voltage $V_R$ signal 660 and current $I_R$ signal 662 to the combined down-converting rectifier 200 of FIG. 2, according to example embodiments. In some cases, the fundamental frequency element of current $I_R$ signal 662 may be the same as current $I_R$ signal 462. Also, FIGS. 6B-C illustrate examples 601 and 602, respectively, of switching signals 642-649 for creating signal paths TBR1, TAR1, TAR, and TBR for the right side 340 of the combined down-converting rectifier 200 of FIG. 2, according to example embodiments. In addition, FIGS. 6D-E illustrate examples 603 and 604, respectively, of switching signals 622-629 for creating signal paths TAL, TAL1, TBL1 and TBL for the left side 310 of the combined down-converting rectifier 200 of FIG. 2, according to example embodiments. In one instance, switching signals 622-649 are output by controller 350 to turn switches 322-349 on and off at certain times relative to when current IR crosses zero.

It is noted that the turned off switches of switches 322-349 of examples 500-503 are not shown since they are open circuits and no signal flows through them. Also, the turned on switches of switches 322-349 of examples 500-503 are shown as symbols with their gates touching their source and drain to indicate that they are short circuits and signal does flow through them. Showing the turned on switches of switches 322-349 as symbols with their gates touching their source and drain may be a non-conventional indication of a MOSFET being switched on, but is being used to indicate that the source is shorted to the drain forming a short circuit through the transistor (e.g., from the top to the bottom of each switch as shown).

Signals 600 show an AC electrical signal having AC electrical current $I_R$ 662 and AC electrical voltage $V_R$ 660 that are inputs into combined rectifier 200. AC current $I_R$ 662 and voltage $V_R$ 660 have a period of T and a frequency of 1/T. As shown, current IR 662 is a sine wave having a maximum current value of $I_{Rmax}$ and a minimum current value of $I_{Rmin}$. Current IR 662 crosses zero at times T0, TCross1 and TCross2. As shown, voltage VR 660 is a waveform with 5 steps and 4 transition in each of the positive and negative transitions between a maximum voltage value of $V_{Rmax}$ and a minimum voltage value of $V_{Rmin}$. Voltage $V_R$ crosses zero and switches between values $V_{Rmax}$ and $V_{Rmin}$ at times T0, TCross1 and TCross2.

Signal paths of examples 500-503 as shown in FIGS. 5A-D may be caused by switching switches 322-349 of FIG. 2 using switching signals 622-649, respectively, at times as shown for signals of examples 601-604 of FIGS. 6B-6E, that are asynchronous with times of sign changes of the value of current IR 662 as shown in FIG. 6A.

According to embodiments, the output of switches 342 and 344 will be a rectified version or the positive bias version of AC current $I_R$ 662 and AC voltage $V_R$ 660 when those signals are positive values as described above for FIGS. 3A-4E. This rectified signal will be the input from switch 344 into signal path TBR1 or from switch 342 into signal pathTAR1 and TAR during Time between T0 and TCross1. As a result, after time TCross1, the addition of the voltages of the charges stored in capacitors 343 and 347 in series will be between $\pi/4$ times value $V_{MAX}$ and value $V_{MAX}$, such as being very close to value $V_{MAX}$ where value $V_{MAX}$ represent the amplitude of fundamental frequency content of voltage $V_R$ According to embodiments, the output of switches 322 and 324 will be a rectified version or positive bias version of AC current $I_R$ 662 and voltage $V_R$ 660 when those signals are negative values as described above for FIGS. 3A-4E. This rectified signal will be the input from switch 324 into signal path TAL1 or from 322 into signal path TBL1 and TBL during Time between TCross1 and TCross2. As a result, after TCross2, the addition of the voltages of the charges stored in capacitors 343 and 347 in series will be between $\pi/4$ times value $V_{MAX}$ and value $V_{MAX}$. For example, during time T0 to TCross1, voltage $V_R$ 660 and current $I_R$ 662 may be positive as shown in FIG. 6A. During this time the signal paths of combined rectifier 200 may be paths TAL, TBR1, TAR1 and TAR as shown in FIGS. 3A, 5A and 5B due to switches 322-349 being switched on or off using signals 622-649 as shown in FIGS. 6B-6E.

As shown in FIGS. 5A and 6B-C, to create signal path TBR1 for right side 340 during a first and fifth part of time T0 to TCross1, switches 342 and 346 are switched off while switches 344, 348 and 349 are switched on. In this case, the two capacitors 343 and 347 on the right side 340 discharge in parallel with the voltage of the charges stored in them to voltage $V_{DC}$ 570. Also, in this case, positive voltage $V_R$ or current $I_R$ can flow through a short circuit created through switches 344, 348, 328 and 324 back to the negative side of voltage $V_R$ or to the other side of coil 122. Thus, voltage $V_R$ is 0 volts during signal path TBR1 as shown in FIG. 6A.

At the same time, as shown in FIGS. 5A and 6D-E, to create signal path TAL for left side 310 during the first and fifth part of time T0 to TCross1, switches 322 and 326 are switched off while switches 324, 328 and 329 are switched on. In this case, the two capacitors 323 and 327 on the left side 310 discharge in parallel with the voltage of the charges stored in them to voltage $V_{DC}$ 570. Discharging in parallel for FIGS. 5A-6E may be similar to discharging in parallel as described for FIGS. 3A-4E.

Next, as shown in FIGS. 5B and 6B-C, to create signal path TAR1 for right side 340 during a second and fourth part of time T0 to TCross1, switches 342, 348 and 349 are switched on while switches 344 and 346 are switched off. In this case, capacitors 343 and 347 on the right side 340 charge in parallel with the rectified voltage out of switch 342, while at the same time they discharge in parallel with the voltage of the charges stored in them to voltage $V_{DC}$ 570. Also, in this case, positive voltage $V_R$ or current $I_R$ will flow through a short circuit created through switches 342 and 349; into capacitors 343 and 347, and through the load across voltage $V_R$ (not shown, but mentioned regarding FIG. 2) which in path TAR1 is in parallel with capacitors 343 and 347; and from the other end of the capacitors and load, through a short circuit created through switches 348, 328 and 324 back to the negative side of voltage $V_R$ or other side of coil 122.

Thus, voltage $V_R$ may be a value of volts during signal path TAR1 that is approximately voltage $V_{DC}$, as shown in FIG. 6A.

At the same time, as shown in FIGS. 5B and 6D-E, to create signal path TAL for left side 310 during the second and fourth part of time T0 to TCross1, switches 322 and 326 are switched off while switches 324, 328 and 329 are switched on. In this case, the two capacitors 323 and 327 on the left side 310 discharge in parallel with the voltage of the charges stored in them to voltage $V_{DC}$ 570.

As shown in FIGS. 3A and 6B-E, to create signal path TAR and TAL for right side 340 and left side 310 during a third part of time T0 to TCross1, switches 322-349 are switched as noted for FIG. 3A. In this case, the two capacitors 343 and 347 on the right side 340 charge in series with the rectified voltage out of switch 342 while the two capacitors 323 and 327 on the left side 310 discharge in parallel with the voltage of the charges stored in them to voltage $V_{DC}$ 570.

Also, during time TCross1 to TCross2, voltage $V_R$ 660 and current $I_R$ 662 may be negative as shown in FIG. 6A. During this time, the signal paths of combined rectifier 200 may be paths TAL1, TBL1, TBL and TBR as shown in FIGS. 3B, 5C and 5D due to switches 322-349 being switched on or off using signals 622-649 as shown in FIGS. 6B-6E.

As shown in FIGS. 5C and 6B-C, to create signal path TBR for right side 340 during a first and fifth part of time TCross1 to TCross2, switches 342 and 346 are switched off while switches 344, 348 and 349 are switched on. In this case, the two capacitors 343 and 347 on the right side 340 discharge in parallel with the voltage of the charges stored in them to voltage $V_{DC}$ 570.

At the same time, as shown in FIGS. 5C and 6D-E, to create signal path TAL1 for left side 310 during the first and fifth part of time TCross1 to TCross2, switches 322 and 326 are switched off while switches 324, 328 and 329 are switched on. In this case, the two capacitors 323 and 327 on the left side 310 discharge in parallel with the voltage of the charges stored in them to voltage $V_{DC}$ 570. Also, in this case, negative voltage $V_R$ or current $I_R$ can flow through a short circuit created through switches 324, 328, 348 and 344 back to the positive side of voltage $V_R$ or to the other side of coil 122. Thus, voltage $V_R$ is 0 volts during signal path TAL1 as shown in FIG. 6A.

Next, as shown in FIGS. 5D and 6B-C, to create signal path TBR for right side 340 during a second and fourth part of time TCross1 to TCross2, switches 322 and 326 are switched off while switches 324, 328 and 329 are switched on. In this case, the two capacitors 323 and 327 on the left side 310 discharge in parallel with the voltage of the charges stored in them to voltage $V_{DC}$ 570.

At the same time, as shown in FIGS. 5D and 6D-E, to create signal path TBL1 for left side 310 during the second and fourth part of time TCross1 to TCross2, switches 322, 328 and 329 are switched on while switches 324 and 326 are switched off. In this case, capacitors 323 and 327 on the left side 310 charge in parallel with the rectified voltage out of switch 322, while at the same time they discharge in parallel with the voltage of the charges stored in them to voltage $V_{DC}$ 570. Also, in this case, positive voltage $V_R$ or current $I_R$ will flow through a short circuit created through switches 322 and 329; into capacitors 323 and 327, and the load across voltage $V_R$ (not shown, but mentioned regarding FIG. 2) which in path TBL1 is in parallel with capacitors 323 and 327; and from the other end of the capacitors and load, through a short circuit created through switches 328, 348 and 344 back to the negative side of voltage $V_R$ other side of coil 122. Thus, voltage $V_R$ may be a value of volts during signal path TBL1 that is approximately voltage $V_{DC}$, as shown in FIG. 6A.

As shown in FIGS. 3B and 6B-E, to create signal path TBR and TBL for right side 340 and left side 310 during a third part of time TCross1 to TCross2, switches 322-349 are switched as noted for FIG. 3B. In this case, the two capacitors 323 and 327 on the left side 310 charge in series with the rectified voltage out of switch 322 while the two capacitors 343 and 347 on the right side 340 discharge in parallel with the voltage of the charges stored in them to voltage $V_{DC}$ 570.

According to some embodiments, controller 350 is switching on and off switches 322-349 at times that are asynchronous with times of sign changes of an electrical current value of the AC current $I_R$ 662 as shown in FIGS. 6B-E. Switching at times that are asynchronous with times of sign changes may be switching at times that are not when the AC current $I_R$ 662 does not cross zero current, from positive to negative current or from negative to positive current. Here, switching at times that are asynchronous with times of sign changes causes AC voltage $V_R$ to have 3 more steps between values $V_{Rmax}$ and $V_{Rmin}$ when traveling in the positive voltage and the negative voltage direction of AC voltage $V_R$ as shown in FIG. 6A as compared to the 2 steps FIG. 4A. For example, the 3 more steps correspond to signal paths TAR1, (TBR1 and TAL1) and TBL1 as shown in FIGS. 5A-C; as compared to the 2 square wave signal paths TAR and TBL shown in FIGS. 3A-B. The combination of the 2 square wave steps and the 3 added steps creates a 5 stepped change in voltage $V_R$ between values $V_{Rmax}$ and $V_{Rmin}$, which provides at least the benefit of greatly reducing EMI radiation from the attached receiver coil 122, such as because voltage VR more closely resembles a sine wave than a square wave. The 5 stepped change in voltage $V_R$ also provides at least the benefit of reducing heat created in the device and may allow much more power to be transferred to receiver 120 while also providing the benefit of keeping the EMI radiation to be within certain regulatory standards for consumer electronics.

For example, instead of controller 350 switching signals 422-449 on or off when current IR crosses zero, for time periods 0.5×T as shown in FIGS. 4B-E, controller 350 switches signals 622-649 on or off between when current IR crosses zero for time periods A×T or B×T centered around current values $I_{Rmax}$ and $I_{Rmin}$ as shown in FIGS. 6B-E, where B is less than 0.5 and A is less than B.

For some embodiments, strategic times for switching can be based on strategic duty cycles and timing such that the overall input voltage waveform of voltage $V_R$ has the lowest harmonic contents or EMI, such as by most closely matching a smooth sine wave instead of the jumps of a square wave. This provides at least the benefits of reducing the EMI radiation emitted by receiver coil 122, reducing heat dissipated in receiver 120 and increasing the amount of power that can be transferred through the receiver.

In one instance, the turning on and off the rectifying switches 322, 324, 342, 344 may not be synchronized to the sign changing of the input current $I_R$, but rather be asynchronous with the sign change and optimized with strategic duty cycle and timing such that the overall input voltage waveform $V_R$ has the lowest harmonic contents or THD. Similarly the switch timing of the down converting stage switches 326, 328, 329, 346, 348 and 349 may not be synchronized to the sign changing of the input current $I_R$ either, but rather be asynchronous with the sign change and controlled to switch with strategic duty cycle and timing to form minimum input harmonics or EMI. The combination of these duty-cycle and timing control can create the input voltage waveform having 5 different distinct voltage levels as shown in FIG. 6A, which in turn lead to significantly reduced coil current harmonics and EMI radiation such as where A is between 0.2T and 0.275T; and B is between 0.4T and 0.475T. In a particular case, the duty-cycles of switching signals 622-649 that offers minimum THD is optimized to be A between 0.2 and 0.25T; and B between 0.4T and 0.45T.

In one instance, controller 350 is to control switching of switches 322-349 to switch on and off for durations centered around current values $I_{Rmax}$ and $I_{Rmin}$ that are between 5 percent and 30 percent greater than or less than a 0.5×T. In one instance, the time period of these switches being on or off will be between 5 and 65 percent greater or less in time than of T/2 such as when the time periods A×T, B×T, (0.5T+(0.5T−A×T)) and (0.5T+(0.5T−B×T)) as shown in FIG. 6B-E are all within a range between 0.05-0.65 greater or less in time than of T/2.

In one instance, the time period of these switches being on or off will be between 5 and 30 percent greater or less in time than of T/2 such as when the time periods A×T, B×T, (0.5T+(0.5T−A×T)) and (0.5T+(0.5T−B×T)) as shown in FIG. 6B-E are all within a range between 0.05-0.3 greater or less in time than of T/2. It is noted that this includes a range of being on or off of between 0.8-0.55T and 0.45-0.2T.

As an example, an input signal spectrum comparison can be made between the combined rectifier as described for FIGS. 2, 3 and 5-6, and the down converting rectifier of FIGS. 2-4. In such as comparison, the multi-level waveform generated by the design of combined rectifier 200 with switching as in FIGS. 6A-E offers significant reduction in harmonic contents by up to 50 decibels (dB) as compared to that of switching as in FIGS. 4A-E. This is significant as the EMI is one gating factor for extending wireless power transfer to higher power. For instance, the measured EMI performance for a consumer device using 7 Watts of wireless received power, the $3^{rd}$ and $5^{th}$ harmonics may be very close to the regulatory limits, while for a consumer device having combined rectifier 200 with switching as in FIGS. 6A-E, a 30-50 dB relief may be realized that eases the system EMI design and regulatory certification dramatically.

To further improve the down converting efficiency and reduce the harmonics, combined rectifier 200 with switching as in FIGS. 6A-E can be extended to higher down-converting ratios through adding additional down-converting stages. For example, FIG. 7 illustrates an example of three stage combined down-converting rectifier 700, according to example embodiments.

Figure 7:
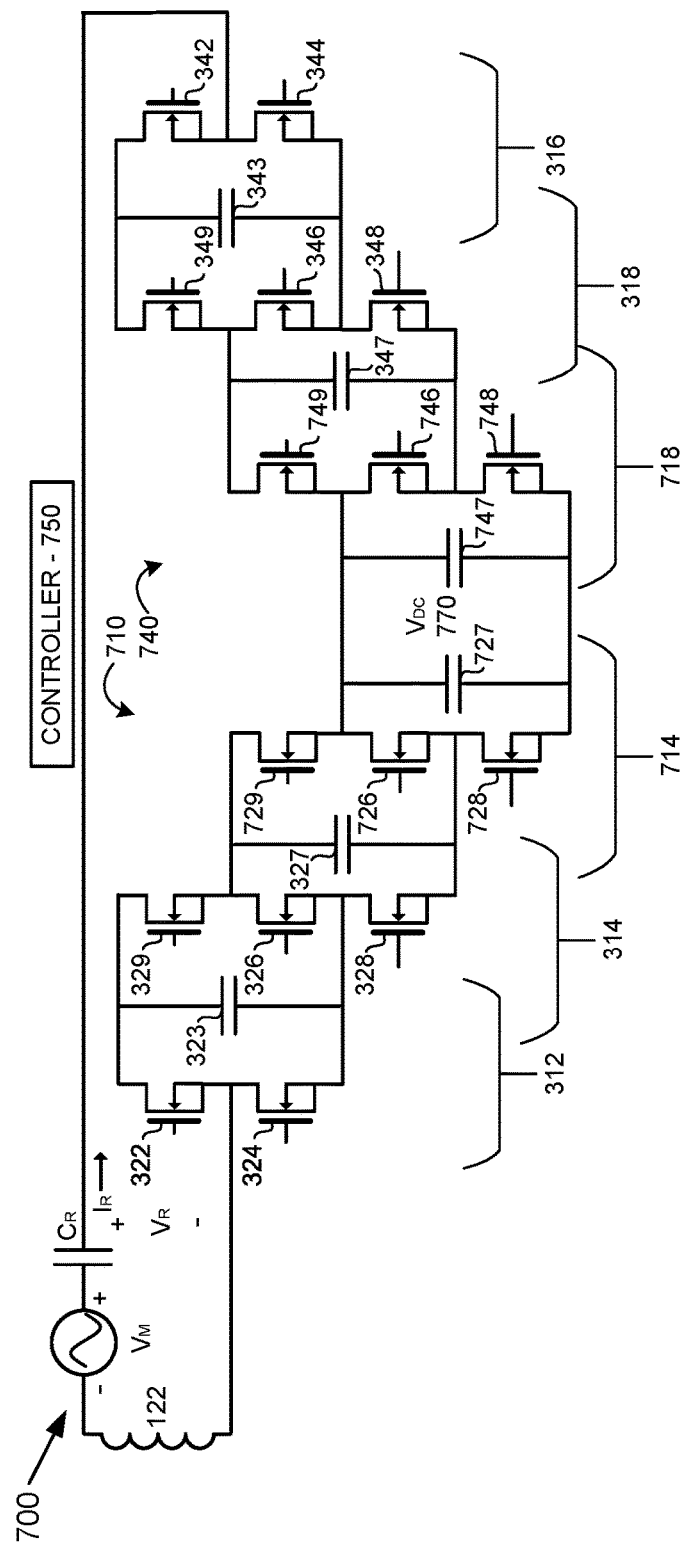
FIG. 7 illustrates an example of a three stage combined down-converting rectifier, according to example embodiments.

Also, FIG. 8A illustrates an example 801 of input voltage and current signals for the combined down-converting rectifier of FIG. 7, according to example embodiments. FIG. 8B-C illustrate examples 802 of switching signals for the right side of the combined down-converting rectifier of FIG. 7, according to example embodiments. In addition, FIG. 8D-E illustrate examples 803 of switching signals for the left side of the combined down-converting rectifier of FIG. 7, according to example embodiments.

As shown in FIG. 7, a mirror image topology 3 stage combined low harmonic down-converting rectifier 700 can be constructed by adding one additional down converting stage to each of left side 310 and right side 340 of combined rectifier 200. Combined rectifier 700 has right half 740 of the mirror image topology having down-converting circuit 718 connected to down-converting circuit 318, which is connected to second part 316. In some cases, circuit 718 may be described as being connected to or across second capacitor 347. In these cases, circuit 718 may be described as including (1) third capacitor 747 to store a third charge of the rectified signal from second part 316 or circuit 318. In these cases, circuit 718 also may be described as including (2) down-converting switches 746, 748 and 749 to down-convert a voltage value of the first charge stored in first capacitor 343 and the second charge stored in second capacitor 347 and the third charge stored in third capacitor 747 to a direct current (DC) signal. This signal may have voltage value $V_{DC}$ that is less than the voltage value of the first charge plus the second charge plus the third charge. In one instance $V_{DC}$ is a third of the voltage value of the first charge plus the second charge plus the third charge.

Combined rectifier 700 has left half 710 of the mirror image topology having down-converting circuit 714 connected to down-converting circuit 314 which is connected to first part 312. In some cases, circuit 714 may be described as being connected to or across second capacitor 327. In these cases, circuit 714 may be described as including (1) third capacitor 727 to store a third charge of the rectified signal from first part 312 or circuit 314. In these cases, circuit 714 also may be described as including (2) down-converting switches 726, 728 and 729 to down-convert a voltage value of the first charge stored in first capacitor 323 and the second charge stored in second capacitor 327 and the third charge stored in third capacitor 727 to a direct current (DC) signal. This signal may have voltage value $V_{DC}$ that is less than the voltage value of the first charge plus the second charge plus the third charge. In one instance $V_{DC}$ is a third of the voltage value of the first charge plus the second charge plus the third charge.

In some cases, combined rectifier 700 includes or has an electrical "load" impedance or resistance across the location shown for voltage $V_{DC}$, such as between and in parallel with capacitors 727 and 747. In some cases, the load is where the DC output of voltage $V_{DC}$ provides power and has an impedance that is equivalent in electrical resistance to 130 or charger 128. For example, such a load may be connected externally to the location shown across voltage $V_{DC}$. The existence of this load may be used when describing certain configurations or power flows of combined rectifier 700. For example, this load will be referred to below with respect to FIGS. 8A-E.

Combined rectifier 700 is shown having a controller circuit or "controller" 750 connected to the rectifying switches 322, 324, 342 and 344; connected to the down-converting switches 326, 328, 329, 346, 348 and 349; and connected to the down-converting switches 726, 728, 729, 746, 748 and 749 to switch on and off the rectifying switches and the down-converting switches using switching signals 822, 824, 842 and 844; switching signals 826, 828, 829, 846, 848 and 849; and switching signals 882, 888, 889, 896, 898 and 899, respectively. For example, the controller may be connected by one or more signal lines (not shown) to each of the switches and switch them on and off such as described for signals 622-649. In the case where the switches are transistors, the controller may be connected by a signal line, wire or trace to the gate of each of the switches. Is some embodiments, controller 750 may include a microcontroller, integrated circuit (IC), logic, software, and/or hardware as described for controller 350.

For some embodiments, controller 750 is able to sense the transition of signal $I_R$ across zero (e.g., see FIG. 8A) and output switching signals 822-899 as shown in FIGS. 8A-E to synchronize the timing of switching switches 322-349 to be at times that are asynchronous with times of the sign changes of the electrical current value of current $I_R$ 862 shown in FIG. 8A, such as described for signals 622-649.

In some instance, FIG. 8A shows the resulting multi-level waveform of input voltage VR 860 where 7 voltage levels are created and the waveform is more close to sine waveform and generates even less harmonic contents than that of voltage $V_R$ 560.

As shown in FIG. 8A, voltage VR 860 is a waveform with 7 steps and 6 transitions in each of the positive and negative transitions between a maximum voltage value of $V_{Rmax}$ and a minimum voltage value of $V_{Rmin}$. Voltage VR crosses zero and switches between values $V_{Rmax}$ and $V_{Rmin}$ at times T0, TCross1 and TCross2.

For example, during time T0 to TCross1, voltage $V_R$ 860 and current $I_R$ 862 may be positive as shown in FIG. 8A. During this time the signal paths of combined rectifier 700 may be paths caused by switching switches 322-749 on or off using signals 822-899 as shown in FIGS. 8B-E.

For FIGS. 7-8E, the first and seventh part of time T0 to TCross1 for right side 740 may correspond to descriptions of signal path TBR1 of FIGS. 5A and 6A-6E, with the exception that positive voltage $V_R$ or current $I_R$ can flow through a short circuit created through switches 344, 348, 748, 728, 328 and 324 back to the negative side of voltage $V_R$ or to the other side of coil 122. Thus, voltage $V_R$ is 0 volts during signal path TBR1 as shown in FIG. 8A.

At the same time, as shown in FIGS. 7-8E, the first and seventh part of time T0 to TCross1 for left side 710 may correspond to descriptions of signal path TAL of FIGS. 5A and 6A-6E, with the exception that the three capacitors 323, 327 and 727 on the left side 310 discharge in parallel with the voltage of the charges stored in them to voltage $V_{DC}$ 770. In one case, discharging in parallel describes that the three capacitors discharge with a signal having a current that is thrice current $I_R$, and with a voltage that is the same as the voltage of the charges stored in any one capacitor which is a voltage that is proportional to a third of voltage $V_R$.

For FIGS. 7-8E, the second and sixth part of time T0 to TCross1 for right side 740 may correspond to descriptions of signal path TAR1 of FIGS. 5B and 6A-6E, with the exception that positive voltage $V_R$ or current $I_R$ can flow through switch 342 and charge three capacitors 343, 347 and 747 in parallel; while at the same time those capacitors discharge in parallel with the voltage of the charges stored in them to voltage $V_{DC}$ 770. Also, in this case, positive voltage $V_R$ or current $I_R$ will flow through a short circuit created through switches 342, 349 and 749; into capacitors 343, 347 and 747, and a load across voltage $V_R$ (not shown, but mentioned regarding FIG. 7) which in this signal path is in parallel with capacitors 343, 347, 747; and from the other end of the capacitors and load through a short circuit created through switches 348, 748, 728, 328 and 324 back to the negative side of voltage $V_R$ or other side of coil 122. Thus, voltage $V_R$ may be a value of volts during this signal path that is the first positive step in voltage which is approximately voltage $V_{DC}$ as shown in FIG. 8A.

At the same time, as shown in FIGS. 7-8E, the second and sixth part of time T0 to TCross1 for left side 710 may correspond to descriptions of signal path TAL of FIGS. 5A and 6A-6E, as noted above for left side 710 during the first and seventh part of time T0 to TCross1.

For FIGS. 7-8E, the third and fifth part of time T0 to TCross1 for right side 740 may correspond to descriptions of signal path TAR1 of FIGS. 5B and 6A-6E, with the exception that positive voltage $V_R$ or current $I_R$ can flow through switch 342 and 346 to charge capacitor 343 in series with the combination of charging two capacitors 347 and 747 in parallel; while at the same time the combination of two capacitors 347 and 747 in parallel discharging with the voltage of the charges stored in them to voltage $V_{DC}$ 770. Also, in this case, positive voltage $V_R$ or current $I_R$ will flow through a short circuit created through switches 342 into capacitor 343 and from there through switch 346 into capacitors 347 and 747 in parallel, and the load across voltage $V_R$ (not shown, but mentioned regarding FIG. 7) which in this signal path is connected in parallel with capacitors 347 and 747; and from the other end of those two capacitors and load through a short circuit created through switches 748, 728, 328 and 324 back to the negative side of voltage $V_R$ or other side of coil 122. Thus, voltage $V_R$ may be a value of volts during this signal path that is the second positive step in voltage approximately twice the voltage $V_{DC}$, which is greater than the first positive step but less than the third positive step in voltage as shown in FIG. 8A.

At the same time, as shown in FIGS. 7-8E, the third and fifth part of time T0 to TCross1 for left side 710 may correspond to descriptions of signal path TAL of FIGS. 5A and 6A-6E, as noted above for left side 710 during the first and seventh part of time T0 to TCross1.

For FIGS. 7-8E, the fourth part of time T0 to TCross1 for right side 740 may correspond to descriptions of signal path TAR of FIGS. 3A and 4A-4E, with the exception that positive voltage $V_R$ or current $I_R$ can flow through switches 342, 346 and 746 to charge capacitors 343, 347 and 747 in series with the rectified voltage. Thus, voltage $V_R$ may be a value of volts during this signal path that is the third and maximum $V_{Rmax}$ positive step in voltage approximately three times the $V_{DC}$ which is greater than the second positive step in voltage as shown in FIG. 8A.

At the same time, as shown in FIGS. 7-8E, the fourth part of time T0 to TCross1 for left side 710 may correspond to descriptions of signal path TAL of FIGS. 5A and 6A-6E, as noted above for left side 710 during the first and seventh part of time T0 to TCross1.

In addition, during time TCross1 to TCross2, voltage $V_R$ 860 and current $I_R$ 862 may be negative as shown in FIG. 8A. During this time the signal paths of combined rectifier 700 may be paths caused by switching switches 322-749 on or off using signals 822-899 as shown in FIGS. 8B-E.

For example, the switching signals and signals paths noted above for times T0 to TCross1 for the left and right side can be applied at a phase shift of 180 degrees to rectifier 700 for the negative voltage $V_R$ and current $I_R$, such as is shown in FIGS. 2-6E. In other words, the switching signals and signal paths above can be applied to the opposing sides of rectifier 700 by controller 750 for the negative polarity voltage $V_R$ and current $I_R$ signals with respect to time TCross1 to TCross2.

As shown in and described for FIGS. 8B-E, controller 750 may switch on and off switches 322-349 and 726-749 at times that are asynchronous with times of sign changes of an electrical current value of the AC current $I_R$ 862. Switching the switches as shown in FIGS. 8B-E causes AC voltage $V_R$ to have 2 more steps between values $V_{Rmax}$ and $V_{Rmin}$ when traveling in the positive voltage and the negative voltage direction of AC voltage $V_R$ as shown in FIG. 8A as compared to the 5 steps FIG. 6A. For example, the 2 more steps correspond to signal paths corresponding to switching signals for time periods TAR2 and TBL2 as shown in FIGS. 8B-E; as compared to those for the 5 switching signals shown in FIGS. 6B-E. The combination of the 5 steps and the 2 added steps creates a 7 stepped change in voltage $V_R$ between values $V_{Rmax}$ and $V_{Rmin}$, which provides at least the benefit of greatly reducing EMI radiation from the attached receiver coil 122, such as because voltage $V_R$ more closely resembles a smooth sine wave than a rough or stepped sine wave. The 7 stepped change in voltage $V_R$ also provides at least the benefit of reducing heat created in the device and may allow much more power to be transferred to receiver 120 while also providing the benefit of keeping the EMI radiation to be within certain regulatory standards for consumer electronics.

For some embodiments, controller 750 switches signals 822-899 on or off between when current IR crosses zero for time periods C×T, D×T and E×T centered around current values $I_{Rmax}$ and $I_{Rmin}$ as shown in FIGS. 8B-E, where E is less than 0.5, D is less than E, and C is less than B.

For some embodiments, the switching of switches 322-749 can be at strategic times based on strategic duty cycles and timing such that the overall input voltage waveform of voltage $V_R$ has the lowest harmonic contents or EMI, such as by most closely matching a smooth sine wave instead of the jumps of a square wave. This provides at least the benefits of reducing the EMI radiation emitted by receiver coil 122, reducing heat dissipated in receiver 120 and increasing the amount of power that can be transferred through the receiver.

For example, the turning on and off of the rectifying switches 322, 324, 342, 344 may not be synchronized to the sign changing of the input current $I_R$, but rather be asynchronous with the sign change and optimized with strategic duty cycle and timing such that the overall input voltage waveform $V_R$ has the lowest harmonic contents or THD. Also, the switch timing of the down converting stage switches 326, 328, 329, 346, 348 and 349; and 726, 728, 729, 746, 748 and 749 may not be synchronized to the sign changing of the input current $I_R$ either, but rather be asynchronous with the sign change and controlled to switch with strategic duty cycle and timing to form minimum input harmonics or EMI. The combination of these duty-cycle and timing control can create the input voltage waveform having 7 different distinct voltage levels as shown in FIG. 8A, which in turn lead to significantly reduced coil current harmonics and EMI radiation such as where C is between 0.19T and 0.215T; D is between 0.3T and 0.35T; and E is between 0.425T and 0.475T. In a particular case, the duty-cycles of switching signals 822-899 offers minimum THD is optimized to be C between 0.2T and 0.22T; D between 0.32T and 0.33T; and E between 0.44T and 0.46T.

In one instance, controller 750 is to control switching of switches 322-749 to switch on and off for durations centered around current values $I_{Rmax}$ and $I_{Rmin}$ that are between 5 percent and 65 percent greater than or less than a 0.5×T. In one instance, the time period of these switches being on or off will be between 5 and 65 percent greater or less in time than of T/2 such as when the time periods C×T, D×T, E×T, (0.5T+(0.5T−C×T)), (0.5T+(0.5T−D×T)) and (0.5T+(0.5T−E×T)) as shown in FIG. 8B-E are all within a range between 0.05-0.65 greater or less in time than of T/2.

In one instance, controller 750 is to control switching of switches 322-749 to switch on and off for durations centered around current values $I_{Rmax}$ and $I_{Rmin}$ that are between 5 percent and 30 percent greater than or less than a 0.5×T. It is noted that this includes a range of being on or off of between 0.8-0.55T and 0.45-0.2T.

For example, an input signal spectrum comparison can be made between the combined rectifier as described for FIGS. 7-8E, and the down converting rectifier of FIGS. 2, 3 and 5-6. In such as comparison, the multi-level waveform generated by the design of combined rectifier 700 with switching as in FIGS. 8A-E may offer significant reduction in THD such as by halving the THD, and increases in efficiency such as by as much as 5 percent, as compared to that of switching as in FIGS. 6A-E.

In addition to the efficiency and harmonic levels, the embodiments described for FIGS. 2-8 also present a benefit of only requiring switching devices to withstand very low switching voltage (same as output voltage $V_{DC}$ 770). This feature is particularly advantageous for ICs that include the left side and right side of the combined rectifier as the conduction loss of the switches does not increase linearly with voltage rating. A low voltage device is often much more efficient comparing with devices that is required to tolerate higher voltages.

It can be appreciated that the concepts described above regarding rectifier 700 and switching signals of FIGS. 8A-E provided by controller 750 may be expanded to apply to an N:1 down converting rectifier with (N−1) down converters attached to the halves or sides of the full bridge rectifier. That is, to further improve the down converting efficiency and reduce the harmonics, combined rectifier 700 with switching as in FIGS. 8A-E can be extended to N:1 down-converting ratios through adding additional down-converting stages. In this case, the combined rectifier may have N stages including the halves of the full bridge rectifier and N−1 down-converting circuits on each side of the mirror image topology. For instance, down-converter circuits 714 and 718 can be copied and connected to capacitors 727 and 747 respectively, just as shown and described for attaching circuits 714 and 718 to capacitors 327 and 347.

Figure 9:
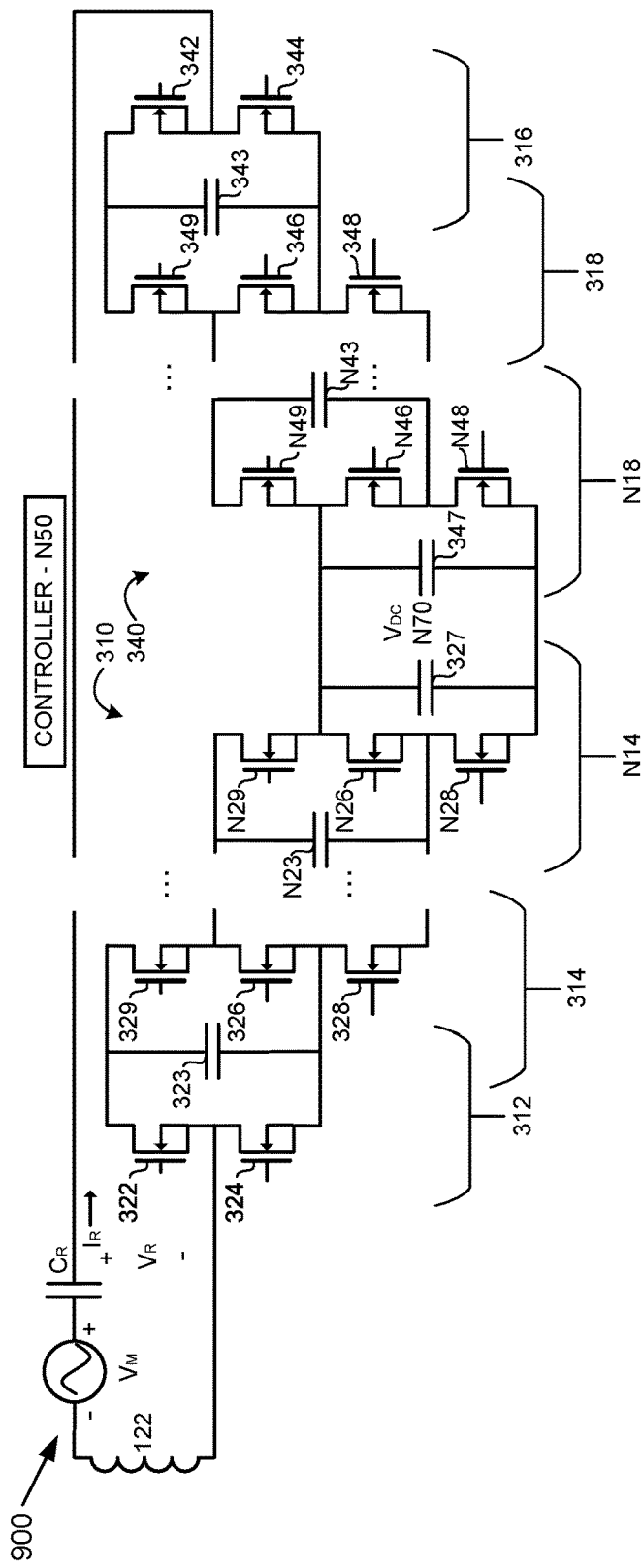
FIG. 9 illustrates an example of an N stage combined down-converting rectifier, according to example embodiments.

For example, FIG. 9 illustrates an example of N stage combined down-converting rectifier 900, according to example embodiments. For some embodiments, as described for controller 750, controller N50 is able to sense the transition of signal IR across zero (e.g., see FIG. 8A) and output switching signals (not shown) to synchronize the timing of switching switches 322-N49 to be at times that are asynchronous with times of the sign changes of the electrical current value of current $I_R$, such as described for signals 622-649, but for N stages. In this situation, another set if switching signals can be added to FIGS. 8B-E having a duration N×T where N is less than C. Adding these signals can be similar to adding signals for circuits 714 and 718 in FIGS. 8B-C as compared to signals of FIGS. 6B-E.

According to some embodiments, the proposed topology of rectifiers 200 and 700 offer great flexibility in their function. In one instance, as an extension to the fundamental concepts described above, a reconfigurable rectifying down-converter can be realized with the existing topologies. For example, it may be beneficial to have a reconfigurable combined rectifier 200 or 700 in some applications where the rectifier is expected to handle a wide range of input power or voltage. With the current topology of rectifier 200, a 2:1 down converting of rectifier 200 can be easily configured to operate as a simple full bridge rectifier to accommodate a lower input voltage or power by keeping switches 328, 329, 348 and 349 on at all times in rectifier 200, such as using controller 350. Similarly a 3:1 down converting rectifier of rectifier 700 can be easily configured to a 2:1 down-converting ratio while keeping the low harmonic benefit, such as to accommodate a lower input voltage or power by keeping switches 728, 729, 748 and 749 on at all times in rectifier 700, and adjusting the timing and duty cycle of the rest of the switches, such as using controller 750. Keeping on the switches as noted above for rectifier 200 or 700 can also be done dynamically as needed to present preferable impedance $R_R$ to the transmitter side.

In one embodiment, keeping on the switches as noted above for rectifier 200 or 700 can include combined controller 350 or 750 is to control switching of the down-converting switches of rectifier 200 or 700 such that each of the down converting circuits maintain a voltage value of the first two charges in capacitors 323 and 343; and maintain the second two charges in capacitors 327 and 347 at a voltage that is the same as the voltage value of the first two charges or the second two charges.

According to some embodiments, the proposed topology of rectifiers 200 and 700 can also be configure to operate as an inverter, where a low voltage DC voltage is applied to the $V_{DC}$ terminal (say a battery). In these embodiments, by switching the switches with same timing and duty-cycle as in the down-converting rectifier cases of rectifiers 200 and 700 as shown in FIGS. 6A-E and 8A-E, an up-converting inverter can be realized with very low harmonic contents. This feature could be used to make the wireless power transfer receiver 120 behave as a transmitter on demand. For example, a smart phone, which uses the embodiments herein in the wireless power receiver module, could use the same circuit both function as a receiver to be charged by a wireless charging pad or function as a transmitter to charge other devices such as another smart phone or smart watch, digital lock etc.

In one embodiments, configuring rectifier 200 or 700 to operate as an inverter as noted above includes the two down-converting circuits 314 and 318 are each to receive a DC signal $V_{DC}$ having a DC voltage value, (1) store charges of the DC signal in each of pairs of capacitors 323/327 and 347/343, and (2) to up-convert a voltage value of the charges of each pair of capacitors into an up-converted signal having a voltage value that is twice of the voltage value of the charges of each pair of capacitors; and the switches of the full bridge rectifier parts 312 and 316 are to invert voltages of the up-converted signal having into an AC signal to be output on the induction coil 122.

According to some embodiments, the proposed topology of rectifiers 200 and 700 is also expandable to multi-frequency operations. For example, in order to accommodate a different wireless power standard that operates at a different frequency of voltage $V_M$ or $V_R$, the topology of rectifiers 200 and 700 are scalable and reconfigurable, and can be dynamically adjusted, such as by controller 350 and 750. In one example, receiver 120 may operate at Qi standard frequency of 110 kHz, and also be reconfigurable to operate at AirFuel Alliance frequency of 6.78 MHz, without the need for additional external components. For example, controller 350 and 750 may control timing of switching of the rectifying switches to rectify and down-convert both the input wireless power signal having frequency of 110 kHz, and also the input wireless power signal having frequency of 6.78 MHz.

In some embodiments, configuring rectifier 200 or 700 to be expandable to multi-frequency operations as noted above includes the controller 350 and 750 to control switching of the rectifying switches to rectify a first AC signal received from the induction coil 122 and having a first frequency of voltage $V_M$ into two rectified signals, and store first two charges of the two rectified signals of the first AC signal in the two first capacitors. When receiving the first AC signal, the controller 350 or 750 is to control switching of the down-converting switches to: (1) store second two charges of the two rectified signals of the first AC signal in the two second capacitors; and (2) down-convert a voltage value of the first two charges and the second two charges to a DC signal having a voltage that is half of the voltage value of the first two charges plus the second two charges. These embodiments may also include, at a different time and for another input signal, the controller 350 and 750 to control switching of the rectifying switches to rectify a second different AC signal received from the induction coil 122 and having a different second frequency of voltage $V_M$ into two rectified signals, and store first two charges of the two rectified signals of the second AC signal in the two first capacitors. When receiving the second AC signal, the controller 350 or 750 is to control switching of the down-converting switches to: (1) store second two charges of the two rectified signals of the second AC signal in the two second capacitors; and (2) down-convert a voltage value of the first two charges and the second two charges to a DC signal having a voltage that is half of the voltage value of the first two charges plus the second two charges.

In some cases, controller 350 and 750 may be or have a memory storage comprising instructions to be executed by one or more processors in communication with the memory storage, for scheduling a data transmission in a network, as described herein. In some cases, controller 350 and 750 may be or have a non-transitory computer-readable medium storing computer instructions for scheduling a data transmission in a network, as described herein.

According to some embodiments, the functional components of controller 350 and 750 may be referred to as processors, modules or components, and may each be executed on a single processor or separate processors. In some embodiments, they could be implemented with any combination of hardware and/or software. They may further include one or more elements for performing any one or combination of processes described in the embodiments.

According to some embodiments, receiver 120 may be a mobile wireless communication device, a pager, cellular telephone, personal digital assistant (PDA), smartphone, smartwatch, laptop computer, or a consumer electronics device. The device may include other components in addition to receiver 120 that are not shown, such as cellular phone components ore smart phone components.

Figure 10:
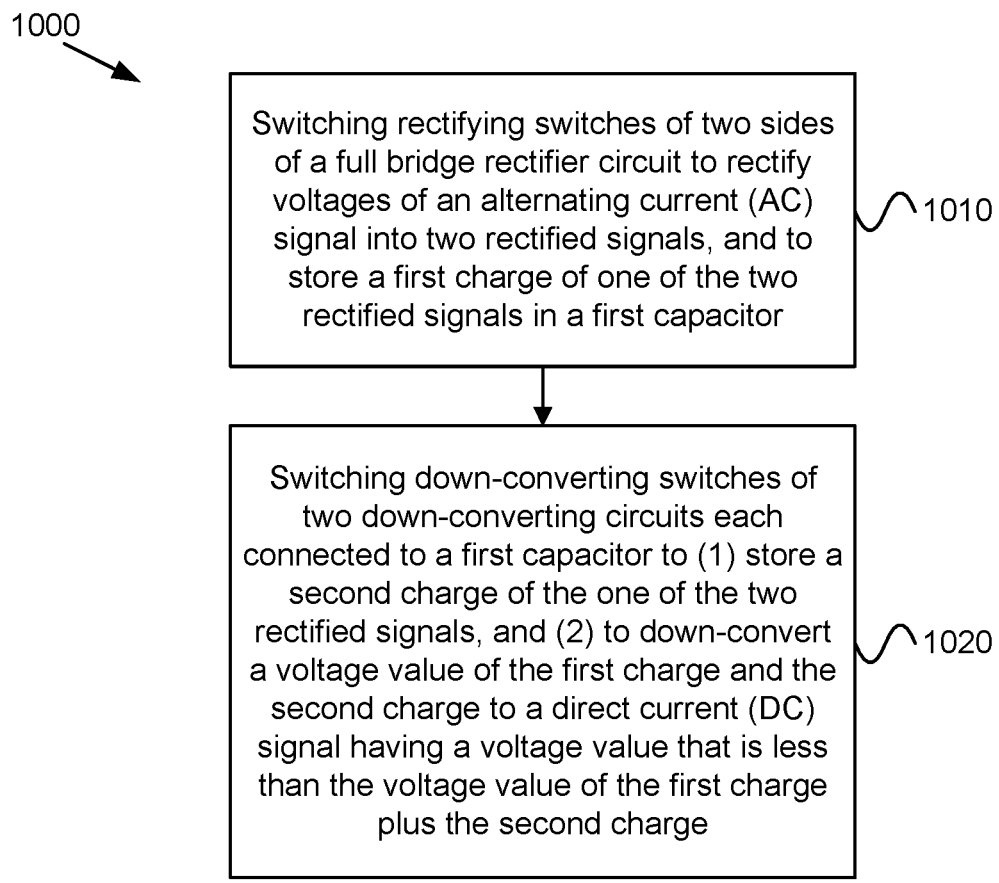
FIG. 10 is a flow diagram of a process for combining down-converting and rectifying of a mirror topology rectifier, according to example embodiments.

FIG. 10 is a flow diagram of a process 1000 for combining down-converting and rectifying of a mirror topology rectifier, according to example embodiments. Process 1000 may be performed by any of rectifiers 200, 700 or 900, such as according to switching signals describe in any of FIGS. 1-9.

At 1010, rectifying switches of two sides of a full bridge rectifier circuit are switched to rectify voltages of an alternating current (AC) signal into two rectified signals, and to store a first charge of one of the two rectified signals in a first capacitor. In one instance, switching the rectifying switches at 1010 includes switching on and off the rectifying switches at times that are asynchronous with times of sign changes of an electrical current value of the AC signal (e.g., see FIGS. 6A-E and 8A-E).

At 1020 down-converting switches of two down-converting circuits each connected to a first capacitor, each having down-converting switches and a second capacitor circuit are switched to (1) store a second charge of the one of the two rectified signals, and (2) to down-convert a voltage value of the first charge and the second charge to a direct current (DC) signal having a voltage value that is less than the voltage value of the first charge plus the second charge. In one instance, switching the down-converting switches at 1020 includes switching on and off the down-converting switches at times that are asynchronous with times of sign changes of an electrical current value of the AC signal (e.g., see FIGS. 6A-E and 8A-E).

For some embodiments, switching the rectifying switches at 1010 and the down-converting switches at 1020 includes configuring one of the rectifying part first capacitors and one of the down-converter second capacitors of one side of the combined rectifier in series to store the first charge and the second charge of the a rectified signal; and configuring another of the rectifying part first capacitors and another of the down-converter second capacitors of the other side of the combined rectifier in parallel to discharge the a stored first charge and a stored second charge.

For some embodiments, prior to switching the rectifying switches at 1010, the AC signal input to the combined rectifier having voltage $V_R$ is received from an induction coil of a wireless power receiver. In this case, the output DC signal having voltage $V_{DC}$ has a voltage value that is half of the voltage value of the first charge plus the second charge; and switching the rectifying switches and the down-converting switches causes the input AC signal having voltage $V_R$ to present a multi-level input voltage waveform having at least five different voltage levels.

For some instances, switching the rectifying switches at 1010 and the down-converting switches at 1020 includes the controller of combined rectifier, such as controller 250, 750 or N50, switching on and off the rectifying switches and the down-converting switches for durations that are between 5 percent and 65 percent greater than or less than half of a period of the input AC signal having voltage $V_R$. In one instance, the time period of these switches being on or off will be between 5 and 65 percent greater or less in time than of T/2 such as when the time periods A×T, B×T, (0.5T+(0.5T−A×T)) and (0.5T+(0.5T−B×T) as shown in FIG. 6B-E are all within a range between 0.05-0.65 greater or less in time than of T/2 such as described above. In another instance, the time period of these switches being on or off will be between 5 and 65 percent greater or less in time than of T/2 such as when the time periods C×T, D×T, E×T, (0.5T+(0.5T−C×T)), (0.5T+(0.5T−D×T)) and (0.5T+(0.5T−E×T) as shown in FIG. 8B-E are all within a range between 0.05-0.65 greater or less in time than of T/2 such as described above.

For some instances, switching the rectifying switches at 1010 and the down-converting switches at 1020 includes the controller of combined rectifier, such as controller 250, 750 or N50, switching on and off the rectifying switches and the down-converting switches for durations that are between 5 percent and 30 percent greater than or less than half of a period of the input AC signal having voltage $V_R$. In one instance, the time period of these switches being on or off will be between 5 and 30 percent greater or less in time than of T/2 such as when the time periods A×T, B×T, (0.5T+(0.5T−A×T)) and (0.5T+(0.5T−B×T) as shown in FIG. 6B-E are all within a range between 0.05-0.3 greater or less in time than of T/2 such as described above. In another instance, the time period of these switches being on or off will be between 5 and 30 percent greater or less in time than of T/2 such as when the time periods C×T, D×T, E×T, (0.5T+(0.5T−C×T)), (0.5T+(0.5T−D×T)) and (0.5T+(0.5T−E×T) as shown in FIG. 8B-E are all within a range between 0.05-0.3 greater or less in time than of T/2 such as described above For some embodiments, the down-converting circuits at 1020 are first down-converting circuits and 1020 further includes switching two second down-converting circuits each connected to one of the first down-converting circuits, and each having a third capacitor to store a third charge of one of the two rectified signals, and to down-convert a voltage value of the first charge, the second charge and the third charge. The down-converting here may be to a DC signal having a voltage value that is one third of the voltage value of the first charge plus the second charge plus the third charge. In these embodiments, switching the second down-converting switches may include switching on and off the second down-converting switches at times that are asynchronous with the times of the sign changes of the electrical current value of the AC signal. Also, in some of these embodiments, switching of the second down-converting switches may include switching on and off the second down-converting switches for durations that are between 5 percent and 65 percent greater than or less than half of a period of the AC signal having voltage $V_R$ as noted above. In addition, in other of these embodiments, switching of the second down-converting switches may include switching on and off the second down-converting switches for durations that are between 5 percent and 30 percent greater than or less than half of a period of the AC signal having voltage $V_R$ as noted above.

For some instances, switching the rectifying switches at 1010 and the down-converting switches at 1020 includes controlling switching of the down-converting switches such that each of the two down-converting circuits maintain a voltage value of the first charge and the second charge to be that of the voltage value of the one of the two rectified signals.

In one instance, switching the rectifying switches at 1010 and the down-converting switches at 1020 includes receiving a DC signal having a DC voltage $V_{DC}$ at an output of each of the two down-converting circuits, and switching the down-converting switches based on receiving this voltage at the output. Here, switching the down-converting switches can be to (1) store a third charge of the DC signal in the second capacitor, (2) store a fourth charge of the DC signal in the first capacitor and (3) up-convert a voltage value of the third charge and fourth charge into an up-converted signal having a voltage value that is twice of the voltage value of the third charge or the fourth charge. This instance, can also include switching the rectifying switches of the full bridge rectifier circuit to invert voltages of the up-converted signal into an AC signal to be output on an induction coil.

In some instances, switching the rectifying switches at 1010 includes rectifying voltages of a first AC signal having voltage $V_R$ and having a first frequency into two rectified signals, or rectifying voltages of a second AC signal having voltage $V_R$ and having a different second frequency into two rectified signals. In this case, a first charge of one of the two rectified signals of the second AC signal can be stored in the first capacitor. Also, in these instances, switching of the down-converting switches at 1020 can include (1) storing a second charge of the one of the two rectified signals of the first AC signal in the second capacitor, or storing a second charge of the one of the two rectified signals of the second AC signal in the second capacitor. It is also considered that, in these instances, switching of the down-converting switches at 1020 can include (2) down-converting a voltage value of the first charge and the second charge to a DC signal having a voltage value that is half of the voltage value of the first charge plus the second charge.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Some embodiments herein may be implemented in computer-readable non-transitory media that includes all types of computer readable media, including magnetic storage media, optical storage media, and solid state storage media and specifically excludes signals. It should be understood that the software can be installed in and sold with the rectifier 200 or 700. Alternatively the software can be obtained and loaded into the rectifier 200 or 700, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

Also, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A combined down-converting rectifier having a mirror topology, comprising:
    two sides of a full bridge rectifier circuit, each having rectifying switches to rectify voltages of an alternating current (AC) signal into two rectified signals, and a first capacitor to store a first charge of one of the two rectified signals;
    two down-converting circuits each connected to one of the first capacitors, each having a second capacitor to store a second charge of the one of the rectified signal, and down-converting switches to down-convert a voltage value of the first charge and the second charge to a direct current (DC) signal having a voltage value that is less than the voltage value of the first charge plus the second charge; and
    a controller circuit connected to the rectifying switches and to the down-converting switches to switch on and off the rectifying switches and the down-converting switches at times that are asynchronous with times of sign changes of an electrical current value of the AC signal.

2. The combined down-converting rectifier of claim 1, wherein the controller circuit is
    to control switching of the rectifying switches and of the down-converting switches to configure one of the two first capacitors and one of the second capacitors in series to store the first charge and the second charge of a rectified signal; and
    to configure another of the two first capacitors and another of the second capacitors in parallel to discharge a stored first charge and a stored second charge.

3. The combined down-converting rectifier of claim 1, wherein:
    the AC signal is received from an induction coil of a wireless power receiver;
    the DC signal has a voltage value that is half of the voltage value of the first charge plus the second charge; and
    the controller circuit has output circuitry to control switching of the rectifying switches and of the down-converting switches to cause the AC signal to present a multi-level input voltage waveform having at least five different voltage levels.

4. The combined down-converting rectifier of claim 3, wherein the controller circuit is to control switching of the rectifying switches and of the down-converting switches to switch on and off for durations that are between 5 percent and 65 percent greater than or less than half of a period of the AC signal.

5. The combined down-converting rectifier of claim 1, wherein the down-converting circuits are first down-converting circuits; and
    further comprising two second down-converting circuits:
        each connected to one of the first down-converting circuits,
        each having a third capacitor to store a third charge of one of the two rectified signals, and second down-converting switches to down-convert a voltage value of the first charge, the second charge and the third charge to a DC signal having a voltage value that is one third of the voltage value of the first charge plus the second charge plus the third charge; and
    wherein the controller circuit:
        is connected to the second down-converting switches, and
        is to switch on and off the second down-converting switches at times that are asynchronous with the times of the sign changes of the electrical current value of the AC signal.

6. The combined down-converting rectifier of claim 5, wherein the controller circuit is to control switching of the second down-converting switches to switch on and off for durations that are between 5 percent and 65 percent greater than or less than half of a period of the AC signal.

7. The combined down-converting rectifier of claim 1, wherein:
    the controller circuit is to control switching of the down-converting switches such that each of the two down-converting circuits maintain a voltage value of the first charge and the second charge to be that of the voltage value of the one of the two rectified signals.

8. The combined down-converting rectifier of claim 1, wherein:
    the two down-converting circuits each have an output to receive a DC signal having a DC voltage value, and each (1) store a third charge of the DC signal in the second capacitor, (2) store a fourth charge of the DC signal in the first capacitor and (3) up-convert a voltage value of the third charge and the fourth charge into an up-converted signal having a voltage value that is twice of the voltage value of the third charge or the fourth charge; and
    the full bridge rectifier circuit rectifying switches are to invert voltages of the up-converted signal into an AC signal to be output on an induction coil.

9. The combined down-converting rectifier of claim 1, wherein:
    the controller circuit is to control switching of the rectifying switches to:
        rectify voltages of a first AC signal having a first frequency into two rectified signals, and store a first charge of one of the two rectified signals of the first AC signal in the first capacitor, or
        rectify voltages of a second AC signal having a different second frequency into two rectified signals, and store a first charge of one of the two rectified signals of the second AC signal in the first capacitor; and
    the controller circuit is to control switching of the down-converting switches to:
        (1) store a second charge of the one of the two rectified signals of the first AC signal in the second capacitor, or
        store a second charge of the one of the two rectified signals of the second AC signal in the second capacitor; and
        (2) down-convert a voltage value of the first charge and the second charge to a DC signal having a voltage value that is half of the voltage value of the first charge plus the second charge.

10. A combined down-converting rectifier having a mirrored topology, comprising:
    two sides of a full bridge rectifier circuit, each having two sets of rectifying switches to rectify voltages of an alternating current (AC) signal into two rectified signals;
    two down-converting circuits, each connected to one of the two sets of rectifying switches, each of the two down-converting circuits having (1) a first capacitor to store a first charge of one of the two rectified signals and a second capacitor to store a second charge of one of the two rectified signals, and (2) down-converting switches to down-convert a voltage value of the first charge and the second charge to a direct current (DC) signal having a voltage value that is less than the voltage value of the first charge plus the second charge; and a controller circuit connected to the rectifying switches and to the down-converting switches to switch on and off the rectifying switches and the down-converting switches at times that are asynchronous with times of sign changes of an electrical current value of the AC signal.

11. The combined down-converting rectifier of claim 10, wherein the controller circuit is to control switching of the rectifying switches and of the down-converting switches to configure one of the first capacitors and one of the second capacitors in series to store the first charge and the second charge of a rectified signal; and to configure another of the first capacitors and another of the second capacitors in parallel to discharge a stored first charge and a stored second charge.

12. A method for combining down-converting and rectifying of a mirror topology rectifier, comprising:

switching rectifying switches of two sides of a full bridge rectifier circuit to rectify voltages of an alternating current (AC) signal into two rectified signals, and to store a first charge of one of the two rectified signals in a first capacitor; and switching down-converting switches of two down-converting circuits each connected to a first capacitor, each having down-converting switches and a second capacitor (1) to store a second charge of the one of the two rectified signals, and (2) to down-convert a voltage value of the first charge and the second charge to a direct current (DC) signal having a voltage value that is less than the voltage value of the first charge plus the second charge;

wherein switching the rectifying switches and the down-converting switches includes switching on and off the rectifying switches and the down-converting switches at times that are asynchronous with times of sign changes of an electrical current value of the AC signal.

13. The method for combining down-converting and rectifying of a mirror topology rectifier of claim 12, wherein switching the rectifying switches and the down-converting switches includes:

configuring one of the first capacitors and one of the second capacitors in series to store the first charge and the second charge of the a rectified signal; and configuring another of the first capacitors and another of the second capacitors in parallel to discharge the a stored first charge and a stored second charge.

14. The method for combining down-converting and rectifying of a mirror topology rectifier of claim 12, further comprising receiving the AC signal from an induction coil of a wireless power receiver;

wherein the DC signal has a voltage value that is half of the voltage value of the first charge plus the second charge; and wherein switching the rectifying switches and the down-converting switches causes the AC signal to present a multi-level input voltage waveform having at least five different voltage levels.

15. The method of for combining down-converting and rectifying of a mirror topology rectifier claim 14, wherein switching of the rectifying switches and the down-converting switches includes switching on and off the rectifying switches and the down-converting switches for durations that are between 5 percent and 65 percent greater than or less than half of a period of the AC signal.

16. The method for combining down-converting and rectifying of a mirror topology rectifier of claim 12, wherein the down-converting circuits are first down-converting circuits; and further comprising switching two second down-converting circuits each connected to one of the first down-converting circuits, and each having a third capacitor to store a third charge of one of the two rectified signals, and to down-convert a voltage value of the first charge, the second charge and the third charge to a DC signal having a voltage value that is one third of the voltage value of the first charge plus the second charge plus the third charge; and wherein switching the second down-converting switches includes switching on and off the second down-converting switches at times that are asynchronous with the times of the sign changes of the electrical current value of the AC signal.

17. The method for combining down-converting and rectifying of a mirror topology rectifier of claim 16, wherein switching of the second down-converting switches includes switching on and off the second down-converting switches for durations that are between 5 percent and 65 percent greater than or less than half of a period of the AC signal.

18. The method for combining down-converting and rectifying of a mirror topology rectifier of claim 12, wherein:

switching of the rectifying switches and the down-converting switches includes controlling switching of the down-converting switches such that each of the two down-converting circuits maintain a voltage value of the first charge and the second charge to be that of the voltage value of the one of the two rectified signals.

19. The method for combining down-converting and rectifying of a mirror topology rectifier of claim 12, further comprising:

receiving a DC signal having a DC voltage value at an output of each of the two down-converting circuits; and switching the down-converting switches (1) to store a third charge of the DC signal in the second capacitor, (2) to store a fourth charge of the DC signal in the first capacitor and (3) to up-convert a voltage value of the third charge and fourth charge into an up-converted signal having a voltage value that is twice of the voltage value of the third charge or the fourth charge; and switching the rectifying switches of the full bridge rectifier circuit to invert voltages of the up-converted signal into an AC signal to be output on an induction coil.

20. The method for combining down-converting and rectifying of a mirror topology rectifier of claim 12, wherein switching of the rectifying switches includes:

rectifying voltages of a first AC signal having a first frequency into two rectified signals, and storing a first charge of one of the two rectified signals of the first AC signal in the first capacitor, or rectifying voltages of a second AC signal having a different second frequency into two rectified signals, and storing a first charge of one of the two rectified signals of the second AC signal in the first capacitor; and wherein switching of the down-converting switches includes:

(1) storing a second charge of the one of the two rectified signals of the first AC signal in the second capacitor, or storing a second charge of the one of the two rectified signals of the second AC signal in the second capacitor; and
(2) down-converting a voltage value of the first charge and the second charge to a DC signal having a voltage value that is half of the voltage value of the first charge plus the second charge.

* * * * *